United States Patent
Roth et al.

(10) Patent No.: US 8,210,695 B2
(45) Date of Patent: Jul. 3, 2012

(54) CHANNELED MIRROR MOUNT

(75) Inventors: Mark R. Roth, Coloma, MI (US); Nigel T. Lock, Holland, MI (US); Danny L. Minikey, Jr., Fenwick, MI (US); Kenneth R. Filipiak, West Olive, MI (US)

(73) Assignee: Gentex Corporation, Zeeland, MI (US)

( * ) Notice: Subject to any disclaimer, the term of this patent is extended or adjusted under 35 U.S.C. 154(b) by 519 days.

(21) Appl. No.: 12/433,205

(22) Filed: Apr. 30, 2009

(65) Prior Publication Data

US 2010/0277821 A1    Nov. 4, 2010

(51) Int. Cl.
*G02B 7/182* (2006.01)

(52) U.S. Cl. ..................................... 359/872

(58) Field of Classification Search .............. 359/871, 359/872, 877
See application file for complete search history.

(56) References Cited

U.S. PATENT DOCUMENTS

| 6,068,380 A | 5/2000 | Lynn et al. |
| 6,467,919 B1 | 10/2002 | Rumsey et al. |
| 7,156,358 B2 | 1/2007 | March et al. |
| 7,264,217 B2 * | 9/2007 | DeLine ......................... 248/481 |
| 7,287,868 B2 * | 10/2007 | Carter et al. .................. 359/871 |

* cited by examiner

*Primary Examiner* — Euncha Cherry
(74) *Attorney, Agent, or Firm* — Price Heneveld LLP; Scott P. Ryan

(57) ABSTRACT

An interior rearview assembly comprising a mount, a rearview housing having a rearview element therein and a connector being configured to be located between the mount and the rearview mirror housing.

51 Claims, 23 Drawing Sheets

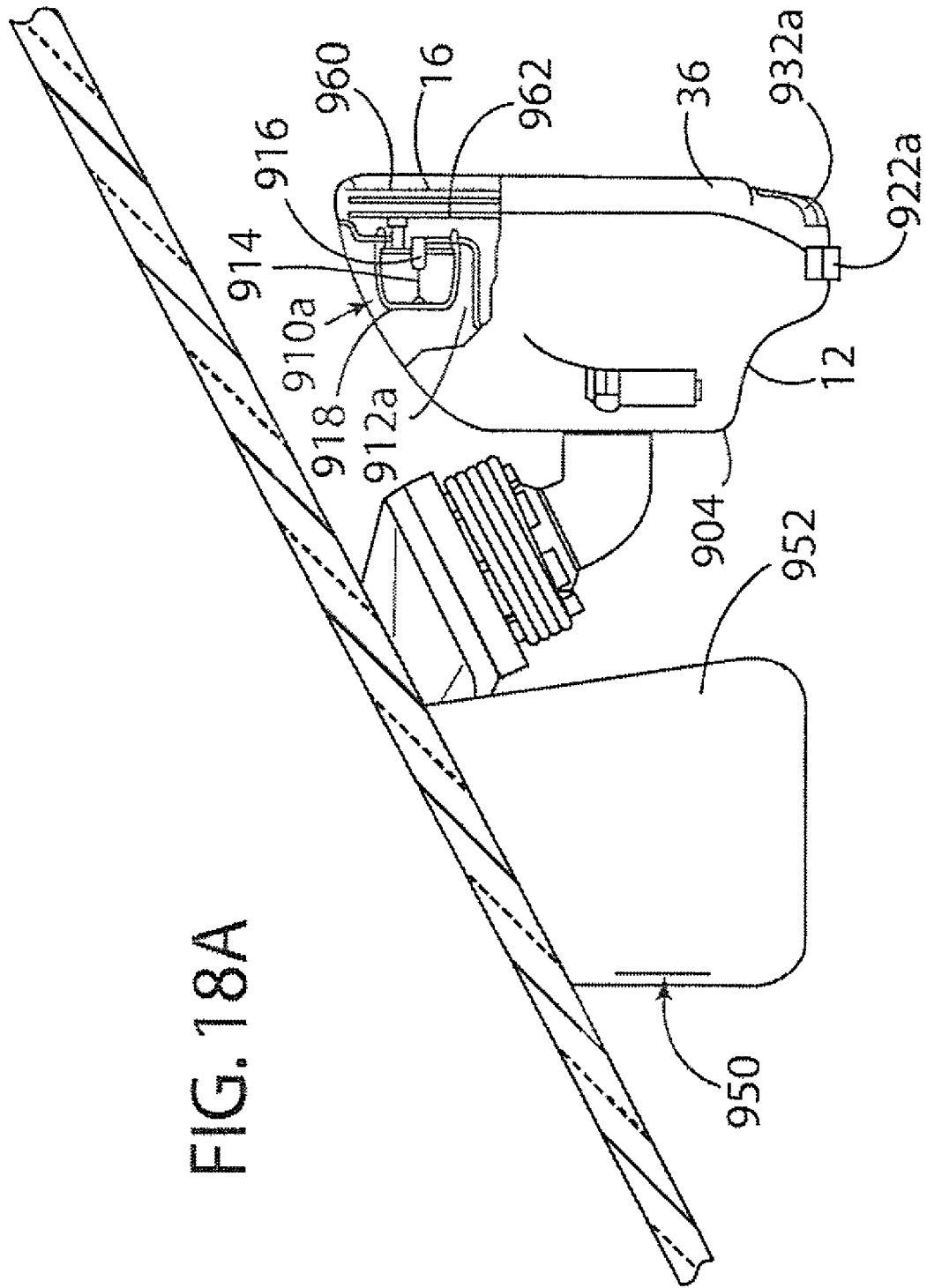

CHANNELED MIRROR MOUNT

FIELD OF THE INVENTION

The present invention concerns rearview mirrors, and more particularly relates to a rearview mirror having a two-ball channeled mount with a wiring passage.

SUMMARY OF THE PRESENT INVENTION

An aspect of the present invention is to provide an interior rearview assembly comprising a mount configured to be connected to a vehicle, a rearview housing having a rearview element therein, and a two-ball connector comprising a center hollow tubular section, a first pivot ball at a first end of the center hollow tubular section and a second pivot ball at a second end of the center hollow tubular section. The two-ball connector is configured to be located between the mount and the rearview housing for allowing the rearview housing to be pivoted relative to the mount along two points of rotation, with a first point of rotation being located within the first pivot ball and a second point of rotation being located within the second pivot ball. The two-ball connector has a wiring passage therethrough, with the wiring passage having a divider to separate at least a portion of the wiring passage into a closed first wiring passage area and a second closed wiring passage area. The first closed wiring passage area and the second closed wiring passage area are separated by the divider. The first closed wiring passage is configured to completely surround wiring and the second closed wiring passage is configured to completely surround wiring.

Another aspect of the present invention is to provide an interior rearview assembly comprising a mount configured to be connected to a vehicle, a rearview housing having a rearview element therein, and a connector comprising a center hollow tubular section, a first end and a second end. The connector is configured to be located between the mount and the rearview housing for allowing the rearview housing to be pivoted relative to the mount along two points of rotation, with a first point of rotation being located within the first end and a second point of rotation being located within the second end. The connector has a wiring passage therethrough with the wiring passage having a divider integral with the connector to separate at least a portion of the wiring passage into a first closed wiring passage area and a second closed wiring passage area. The first wiring passage area and the second wiring passage area are separated by the divider. The connector is formed of at least two separate parts comprising a first part and a second part. When the at least two separate parts are spaced, the wiring passage is open for allowing the laying of wiring therein. When the at least two separate parts are engaged, the wiring passage is closed to maintain the wiring with the wiring passage of the center hollow tubular section.

Yet another aspect of the present invention is to provide a method of assembling an interior rearview assembly comprising providing a mount configured to be connected to a vehicle, providing a rearview housing having a rearview element therein, and providing a two-ball connector comprising a center hollow tubular section, a first pivot ball at a first end of the center hollow tubular section and a second pivot ball at a second end of the center hollow tubular section. The method also includes locating the two-ball connector being between the mount and the rearview housing for allowing the rearview housing to be pivoted relative to the mount along two points of rotation, with a first point of rotation being located within the first pivot ball and a second point of rotation being located within the second pivot ball. The method further includes providing the two-ball connector with wiring passage therethrough, with the wiring passage having a divider. The method also includes separating at least a portion of the wiring passage into a closed first wiring passage area and a second closed wiring passage area with a divider, placing first wiring into the first closed wiring passage area, with the first closed wiring passage surrounding the first wiring, and placing second wiring into the second closed wiring passage area, with the second closed wiring passage surrounding the second wiring.

Another aspect of the present invention is to provide a method of assembling an interior rearview assembly comprising providing a mount configured to be connected to a vehicle, providing a rearview housing having a rearview element therein, and providing a connector comprising a center hollow tubular section, a first end and a second end. The method also includes locating the connector being between the mount and the rearview housing for allowing the rearview housing to be pivoted relative to the mount along two points of rotation, with a first point of rotation being located within the first end and a second point of rotation being located within the second end. The method further includes providing the connector with wiring passage therethrough, with the wiring passage having a divider integral with the connector, and separating at least a portion of the wiring passage into a first wiring passage area and a second wiring passage area with a divider. The method also includes forming the connector from at least two separate parts comprising a first part and a second part, placing first wiring into the first wiring passage area by placing the first wiring onto the first part and engaging the first part with the second part, and placing second wiring into the second wiring passage area by placing the second wiring onto the first part and engaging the first part with the second part. When the at least two separate parts are engaged, the wiring passage is closed to maintain the wiring with the wiring passage of the connector.

Yet another aspect of the present invention is to provide an interior rearview assembly comprising a rearview housing having a rearview element therein and a connector assembly configured to be connected to a vehicle. The connector assembly comprises a hollow tubular section and a first end. The connector is configured to be connected to the rearview housing for allowing the rearview housing to be pivoted relative to the connector assembly along a point of rotation, with a first point of rotation being located within the first end. The connector assembly has a wiring passage therethrough. The connector assembly is formed of at least two separate parts comprising a first part and a second part, with the two parts forming the wiring passage. When the at least two separate parts are spaced in a spaced position, the wiring passage is open for allowing the laying of wiring therein, and when the at least two separate parts are engaged in an engaged position, the wiring passage is closed to maintain the wiring within the wiring passage of the hollow tubular section. The wiring passage has an entrance and an exit whereby the wiring is configured to extend through the entrance and the exit when the at least two separate parts are in the engaged position, with the wiring passage forming a passage line between an entrance center of the entrance and an exit center of the exit. The at least two separate parts include mutual complementary engagement features configured to be engaged to thereby close the wiring passage when the at least two separate parts are moved from the spaced position to the engaged position along a movement line perpendicular to the passage line.

Another aspect of the present invention is to provide a method of assembling an interior rearview assembly comprising providing a rearview housing having a rearview element therein, providing a connector assembly configured to be connected to a vehicle, with the connector assembly comprising a hollow tubular section and a first end, connecting the connector assembly to the rearview housing for allowing the rearview housing to be pivoted relative to the connector assembly along a point of rotation, with the point of rotation being located within the first end, providing the connector with wiring passage therethrough, with the wiring passage having an entrance and an exit and with the wiring passage forming a passage line between an entrance center of the entrance and an exit center of the exit, forming the connector assembly from at least two separate parts comprising a first part and a second part, placing wiring into the wiring passage area by placing wiring onto the first part, providing the at least two separate parts with mutual complementary engagement features, closing the wiring passage by engaging the at least two separate parts along a movement line perpendicular to the passage line whereby the wiring extends through the entrance and exit of the wiring passage, and engaging the mutual complementary engagement to close the wiring passage as the at least two separate parts are moved along the movement line. When the at least two separate parts are engaged, the wiring passage is closed to maintain the wiring within the wiring passage of the connector.

Yet another aspect of the present invention is to provide an interior rearview assembly comprising a mount configured to be connected to a vehicle, a rearview housing having a rearview element therein, and a single-ball connector comprising a center hollow tubular section, a pivot ball at a first end of the center hollow tubular section and a mounting plate at a second end of the center hollow tubular section. The single-ball connector is configured to be located between the mount and the rearview housing for allowing the rearview housing to be pivoted relative to the mount along a single point of rotation, with a first point of rotation being located within the pivot ball. The single-ball connector being fixed in position relative to the rearview housing.

These and other aspects, objects, and features of the present invention will be understood and appreciated by those skilled in the art upon studying the following specification, claims, and appended drawings.

BRIEF DESCRIPTION OF DRAWINGS

FIG. 18A is an elevational view of the side of the rearview assembly constructed according to the present invention connected to a windshield.

DETAILED DESCRIPTION OF PREFERRED EMBODIMENTS

Figure 1:
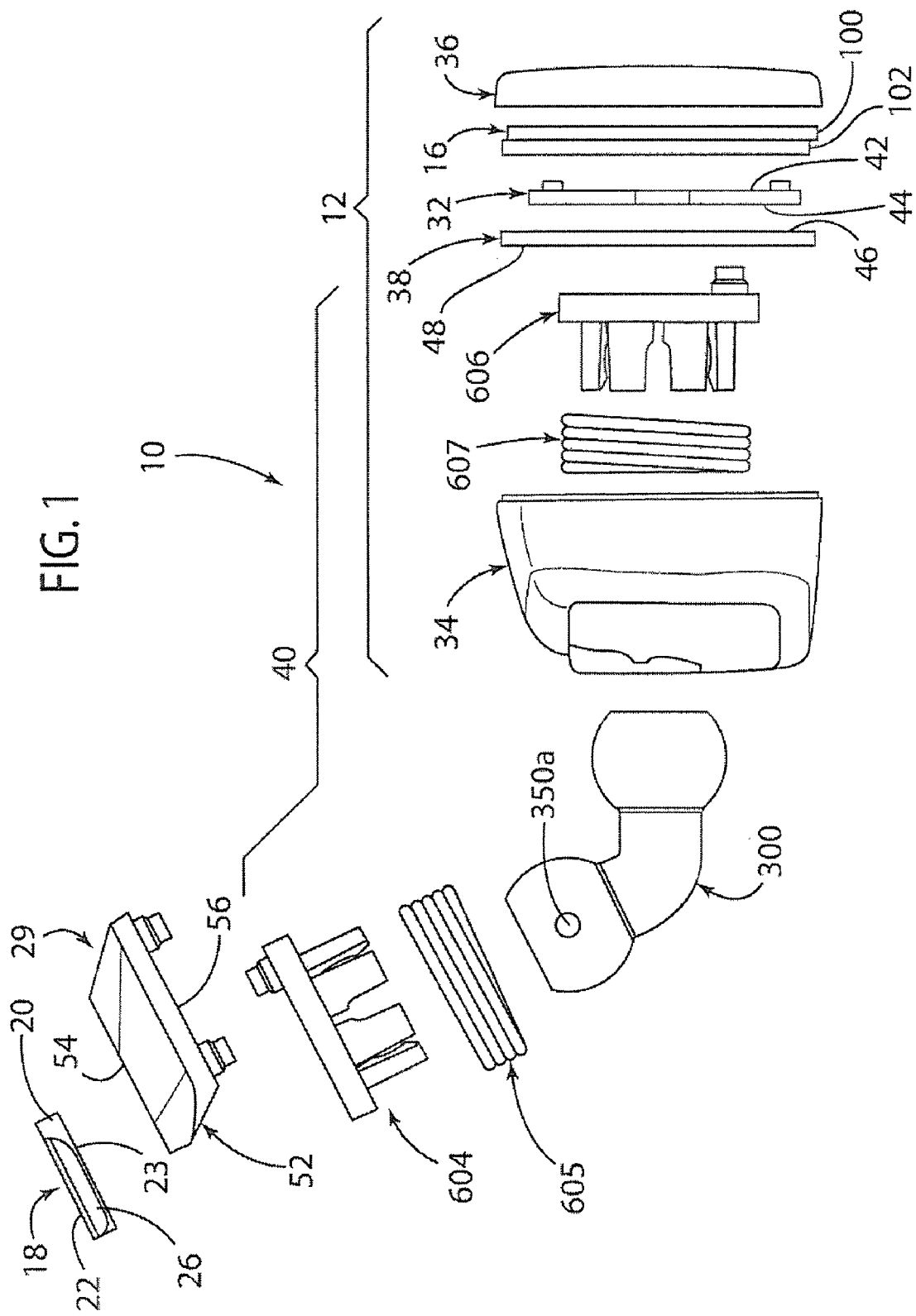
FIG. 1 is an exploded side view of a rearview assembly of the present invention.

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as viewed in FIG. 1. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Figure 2:
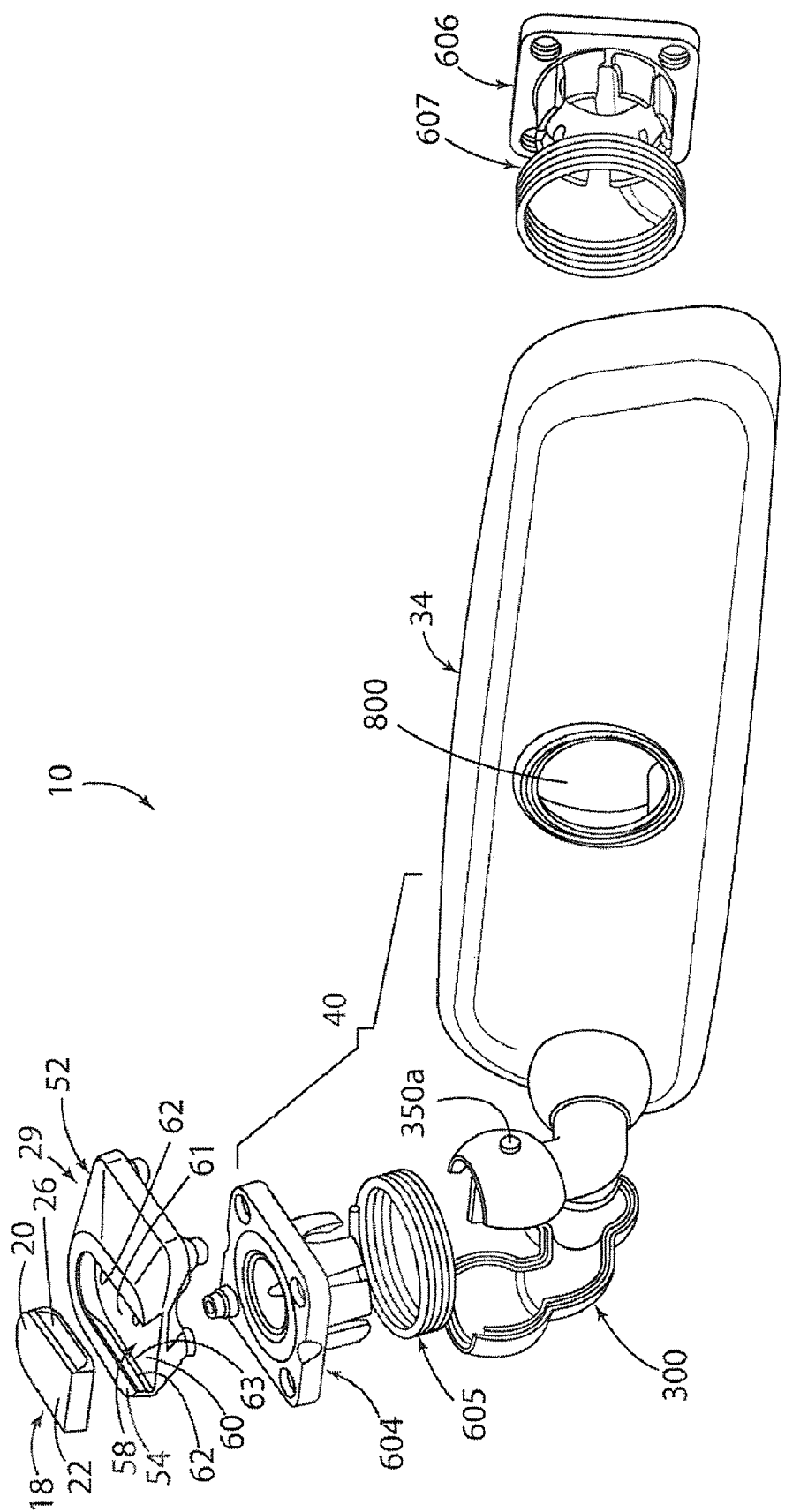
FIG. 2 is an exploded rear perspective view of the rearview assembly of the present invention.
Figure 3:
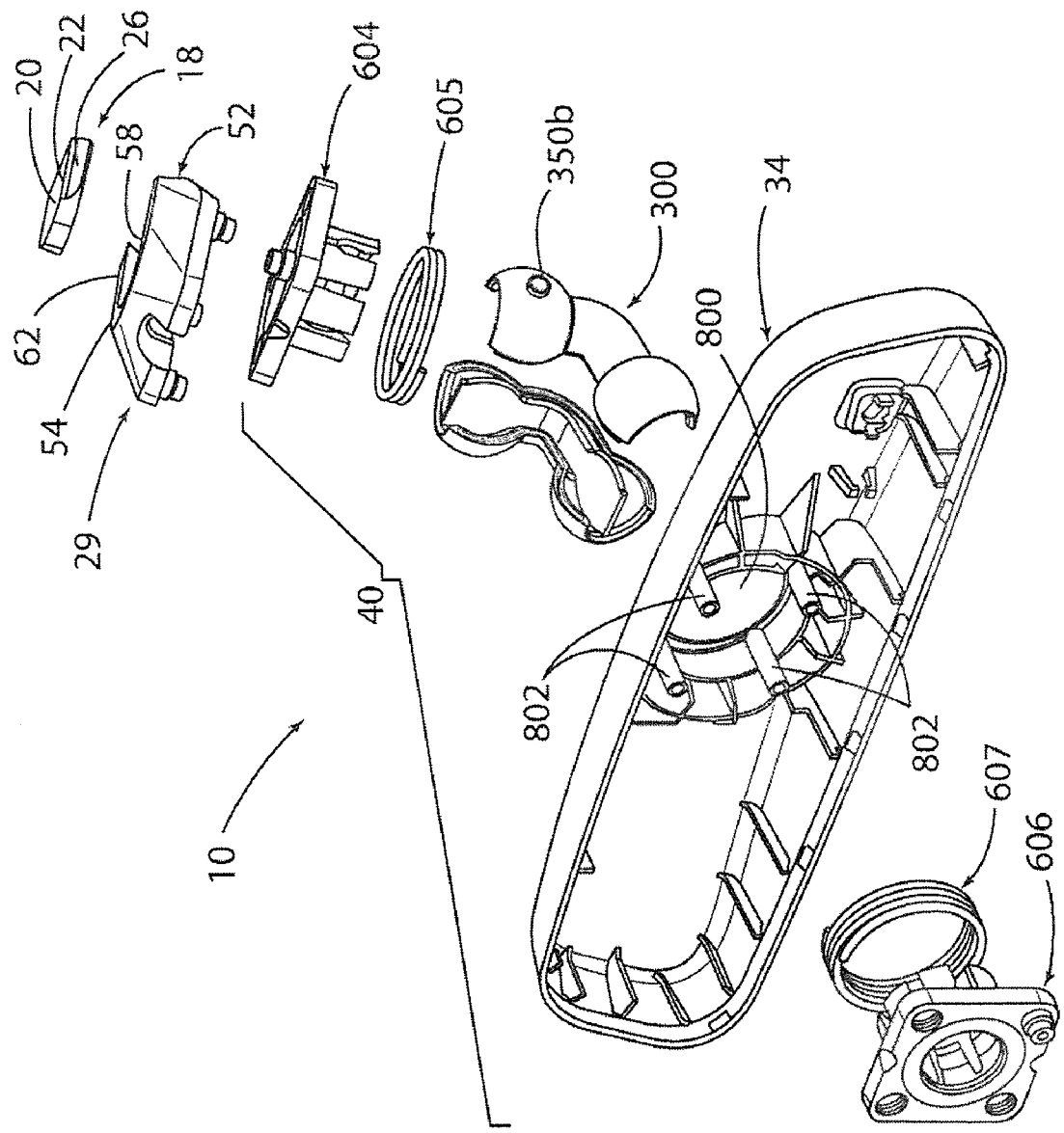
FIG. 3 is an exploded front perspective view of the rearview assembly of the present invention.

The reference number 10 (FIGS. 1-3) generally designates a rearview assembly for a vehicle embodying the present invention. In the illustrated example, the rearview assembly 10 comprises a rearview housing 12, a mount 29 connecting the rearview housing 12 to a vehicle, and a connection assembly 40 connecting the rearview housing 12 to the mount 29. The connection assembly 40 allows the rearview housing 12 to rotate about two points relative to the mount 29. The rearview assembly 10 is configured to have wiring routed through the mount 29, through the connection assembly 40 and to the rearview housing 12 to power and/or control electrical equipment within the rearview housing 12.

The illustrated rearview assembly 10 of the present invention can be an interior rearview assembly positioned within an interior of a vehicle. When the rearview assembly 10 is an interior rearview assembly, the rearview assembly 10 is preferably connected to the mount 29, which is adapted to be mounted inside the vehicle in a location proximate to or on a front windshield of the vehicle. In the illustrated example, the mount 29 is configured to be connected to a windshield (not shown) by a button 18. It is also contemplated that the mount 29 could be connected to the windshield and/or a headliner of the vehicle in other manners well known to those skilled in the art or as disclosed in U.S. Pat. Nos. 6,467,919 and 5,377,948.

In the illustrated example, the rearview housing 12 comprises a rear housing section 34 and a bezel 36. The rearview housing 12 also includes a circuit board 38, a carrier plate 32 and a rearview element 16 therein. The carrier plate 32 can be located behind the reflective element 16 and have the circuit board 38 connected thereto. If the rearview assembly 10 is an interior rearview assembly, the carrier plate 32 is typically fixed in position within the housing 12. The carrier plate 32 of the interior rearview assembly can be used to maintain the position of the rearview element 16 and/or carry the circuit board 38. An example of an interior rearview assembly including a carrier plate and a circuit board is disclosed in U.S. Pat. No. 6,239,899, entitled MIRROR WITH INTERNAL SUPPORT PLATE, the entire contents of which are hereby incorporated herein by reference. In the interior rearview assembly, the carrier plate 32 assists in maintaining the rearview element 16 in position within the housing 12. The rear housing section 34, bezel 36, carrier plate 32, circuit board 38 and their interconnections are well known to those skilled in the art (except for any alterations discussed herein). An example of a rear housing section, a bezel, a carrier plate, a printed circuit board and their interconnections with a mount is disclosed in U.S. Patent Application Publication No. 2005/0152054 entitled REFLECTIVE ELEMENT HOLDER FOR REARVIEW MIRROR, the entire contents of which are hereby incorporated herein by reference. However, it is contemplated that the rearview housing 12 could have a bezel, circuit board and/or carrier plate omitted from the rearview housing 12.

In the illustrated example, the circuit board 38 and the rearview element 16 are located adjacent the carrier plate 32. The carrier plate 32 includes a first face 42 and a second face 44. The circuit board 38 is located adjacent the second face 44 of the carrier plate 32. The circuit board 38 includes a first side 46 facing the carrier plate 32 and a second side 48 facing away from the carrier plate 32. The rearview element 16 is located adjacent the first face 42 of the carrier plate 32.

The illustrated rearview element 16 of the present invention can comprise a reflective element including an electrochromic (EC) mirror subassembly having a front glass element 100 and a rear glass element 102. The illustrated front glass element 100 and the rear glass element 102 are preferably less than 2.2 mm, or more preferably less than about 1.6 mm down to about 1.1 mm. A more detailed description of reflective elements 16 having glass elements of a thickness of 1.1 mm is disclosed in U.S. Pat. No. 6,195,194 entitled LIGHTWEIGHT ELECTROCHROMIC MIRROR, the entire contents of which are hereby incorporated herein by reference. In the illustrated embodiment, the rearview element 16 is in an interior rearview mirror and therefore has a reflectance value of about 70 percent or greater.

The illustrated rearview element 16 includes an electrochromic (EC) material positioned between the front glass element 100 and the rear glass element 102. Furthermore, a reflector material is preferably located on either the front surface or the rear surface of the rear glass element 102, depending upon the type of the mirror subassembly. The EC material is preferably a solution phase (sometimes called herein a "liquid-phase" or "gel-type") EC material, as disclosed in U.S. Pat. No. 4,902,108 entitled SINGLE-COMPARTMENT, SELF-ERASING, SOLUTION-PHASE ELECTROCHROMIC DEVICES, SOLUTIONS FOR USE THEREIN, AND USES THEREOF and U.S. Pat. No. 5,278,693 entitled TINTED SOLUTION-PHASE ELECTROCHROMIC MIRRORS, the entire contents of both of which are hereby incorporated herein by reference. In addition, a hybrid system where part of the electrochromic medium is solid-state and part is solution phase is also contemplated. Solution-phase materials, because of their liquidic or flowable properties, do not rigidly bond the front glass element 100 and the rear glass element 102 together like a completely solid-state EC medium. As a result, the stiffness of the rearview element 16 using 1.1 mm thick glass elements and a solution-phase EC material is more flexible than an EC mirror subassembly having 1.1 mm thick glass elements and a solid-state phase EC material because, in the rearview element 16 having solid-state phase EC material, the thick glass elements are bonded together in a manner that causes them to bend much like a single glass element having their total thickness. Contrastingly, the rearview element 16 with the solution phase EC material bends in a complex manner wherein the thin glass elements bend simultaneously but independently and separately and wherein the solution phase EC material ebbs and flows somewhat in reaction to the stress. The net result is that the mirror subassembly with solution phase EC material tends to be more flexible and concurrently more sensitive to impact than the mirror subassembly with solid-state phase EC material, even where the front and rear glass elements have the same thickness and other properties. Although the rearview element 16 is illustrated as including the EC material, it is contemplated that the rearview element 16 could be any type of reflective surface. For example, the rearview element 16 could be a prismatic mirror. It is also contemplated that the rearview element 16 could comprise a video screen (e.g., LCD screen) configured to show the area surrounding or behind the vehicle.

In the illustrated example, wiring 50 (see FIG. 9) is routed through the mount 29 and the connection assembly 40 and into the housing 12 for supplying and/or receiving power and control to circuits within the rearview housing 12. For example, the wiring 50 can be used to power the EC mirror as discussed above or power and/or control of the electrical components discussed in more detail below. In the illustrated example, the wiring 50 enters the rear housing section 34 through the mount 29 and the connection assembly 40.

In the illustrated embodiment, the mount 29 is configured to be connected to a windshield of the vehicle via the button 18. In the illustrated example, a peripheral body 20 of the button 18 has a generally rectangular shape, although it is contemplated that the peripheral body 20 could have any geometric shape. The peripheral body 20 includes a first side 22 and a second side 23, with the first side 22 being configured to be autoclaved to the windshield in a manner known to those skilled in the art. However, it is contemplated that the button 18 could be connected to the windshield in other manners. For example, the button 18 could be connected to the windshield by an adhesive such as an epoxy, a polyvinyl butyral, a urethane, or a silicone adhesive material or the like. The button 18 also includes a pair of fingers 26 extending outwardly from opposite sides of the peripheral body 20, with the fingers 26 configured to be received within the mount 29 for connecting the mount 29 to the button 18 as discussed in more detail below.

The illustrated mount 29 is configured to be connected to the button 18 to connect the rearview assembly 10 to the vehicle. The mount 29 comprises a main body 52 having a first side 54 and a second side 56. The first side 54 of the main body 52 includes a slot 58 for accepting the button 18 therein. The slot 58 also includes an entrance 60 in a side of the main body 52. The slot 58 generally has a same periphery shape as the peripheral body 20 of the button 18. The mount 29 is configured to be connected to the button 18 by sliding the button 18 into the slot 58 through the entrance 60 in the side of the main body 52. In the illustrated example, the slot 58 includes a bottom surface 61 and a pair of oppositely facing ledges 62 thereby defining a pair of receiving areas 63 between the bottom surface 61 of the slot 58 and the ledges 62. The receiving areas 63 are configured to receive the fingers 26 of the button 18 as the button 18 is slid into the slot 58. The fingers 26 prevent the button 18 from being removed from the slot 58 in a direction perpendicular to the direction of movement of the button 18 into the slot 58 through the entrance 60. It is also contemplated that a fastener (not shown) could be inserted through the main body 52 and into the button 18 once the button 18 is fully inserted into the slot 58 to maintain the button 18 within the slot 58. It is further contemplated that the button 18 could be connected to the mount 29 in other manners. For example, the button 18 could be adhered to the mount 29 within the slot 58. Moreover, it is contemplated that the mount 29 could be connected to the button 18 in any manner or that the mount 29 could be connected to a headliner of the vehicle as is well known to those skilled in the art.

In the illustrated example, the mount 29 is configured to have the wiring 50 routed therethrough. The main body 52 of the mount 29 includes a channel 64 in the second side 56 thereof, with the channel 64 having a top entry 66 at a top edge of the main body 52 and a bottom entry 68 at a bottom edge of the main body 52. As discussed in more detail below, the wiring 50 is configured to enter the channel 64 through the top entry 66 and the bottom entry 68 and then be routed to the connection assembly 40.

The illustrated mount 29 is configured to be linked to the connection assembly 40 for supporting the connection assembly 40 and the rearview housing 12. The mount 29 includes a plurality of posts 70 extending from the second side 56 of the main body 52. The posts 70 can be circular or any other geometric shape and can be cylindrical, tapered or stepped (see FIGS. 1-3 and 6-8). The main body 52 can also include a hole 72 in the second side 56. The hole 72 can be circular or any other geometric shape and can be cylindrical, tapered or stepped. As discussed in more detail below, the posts 70 are configured to be inserted into the connection assembly 40 and the hole 72 is configured to receive a portion of the connection assembly 40 to assist in linking the connection assembly 40 with the main body 52 of the mount 29. While three posts 70 and one hole 72 are illustrated as forming a rectangle, it is contemplated that any number of posts 70 and stepped holes 72 could be used (including only posts 70 or only holes 72) and that the posts 70 and holes 72 could be in any location on the second side 56 of the main body 52 of the mount 29.

In the illustrated example, the connection assembly 40 is configured to connect the rearview housing 12 to the mount 29 and to route the wiring 50 from the mount 29 to the rearview housing 12. The connection assembly 40 includes a first receiver 604, a first spring 605, a two-ball connector 300, a second receiver 606 and a second spring 607. The first receiver 604 is configured to be connected to the mount 29 and the second receiver 606 is configured to be connected to the rearview housing 12. Furthermore, the first receiver 604 and the second receiver 606 are each configured to receive the two-ball connector 300, with the first spring 605 and the second spring 607 maintaining the two-ball connector 300 within the first receiver 604 and the second receiver 606, respectively.

Figure 9:
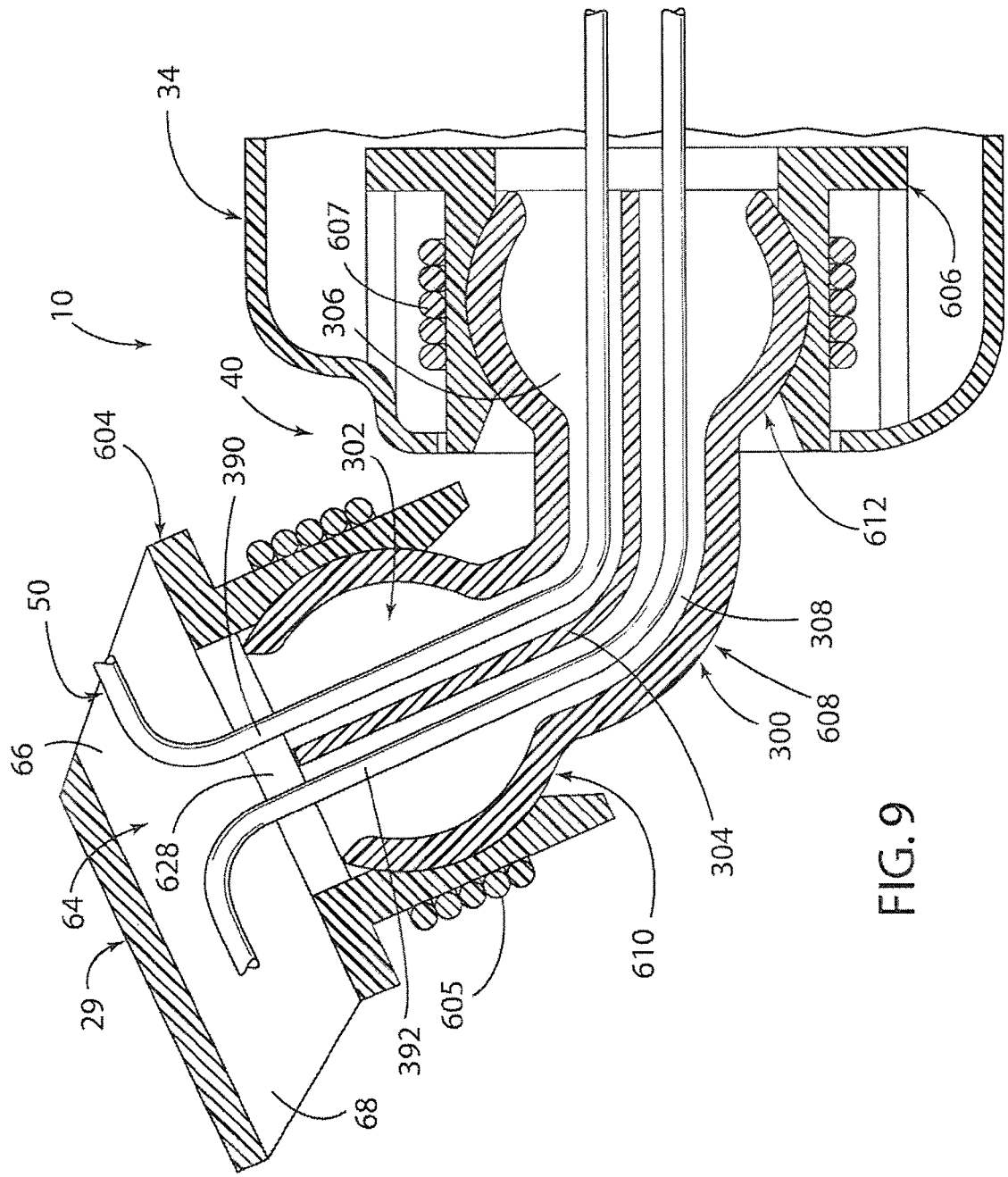
FIG. 9 is a cross-sectional view of the button, the mount, the connector, a pair of receivers, a pair of springs and a rear housing section of a rearview mirror housing of the rearview assembly of the present invention.

In the illustrated example, the two-ball connector 300 is connected to the mount 29 by the first receiver 604 and to the rear housing section 34 by the second receiver 606. The two-ball connector 300 includes a center tubular section 608, a first ball 610 at a first end of the center tubular section 608 and a second ball 612 at a second end of the center tubular section 608. As illustrated in FIG. 9, the two-ball connector 300 includes a wiring passageway 302 that passes through the first ball 610, the center tubular section 608 and the second ball 612. Furthermore, the two-ball connector 300 includes a divider 304 for dividing the wiring passageway 302 into a first wiring passage area 306 and a second wiring passage area 308, with the first wiring passage area 306 and the second wiring passage area 308 being separated by the divider 304.

Figure 4:
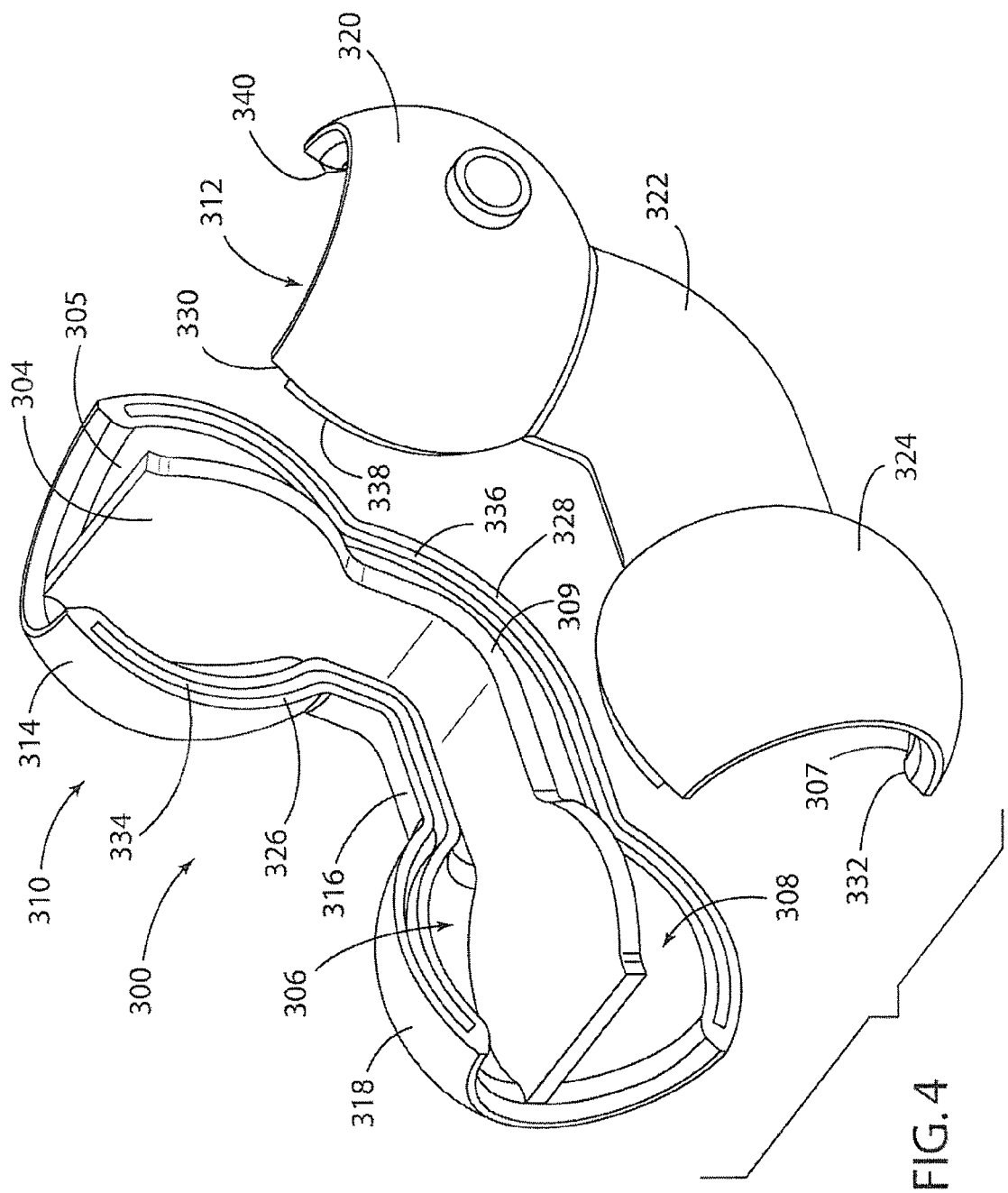
FIG. 4 is an exploded front perspective view of a connector of the rearview assembly of the present invention.

The illustrated two-ball connector 300 can be formed of at least two parts along the length of the two-ball connector 300. The two parts can comprise a first part 310 and a second part 312. As illustrated in FIGS. 1-4, the first part 310 can include a first part, first ball half-shell 314, a first part tubular section half-shell 316 and a first part, second ball half-shell 318. Likewise, the second part 312 can include a second part, first ball half-shell 320, a second part tubular section half-shell 322 and a second part, second ball half-shell 324. The first part 310 is configured to be connected with the second part 312 to form the completed two-ball connector 300. As illustrated in FIG. 4, the first part 310 includes a first part top mating edge 326 and a first part bottom mating edge 328. Likewise, the second part 312 includes a second part top mating edge 330 and a second part bottom mating edge 332. When the first part 310 is mated with the second part 312, the first part top mating edge 326 of the first part 310 abuts the second part top mating edge 330 of the second part 312 and the first part bottom mating edge 328 of the first part 310 abuts the second part bottom mating edge 332 of the second part 312. As illustrated in FIG. 4, the first part top mating edge 326 includes a top groove 334 and the first part bottom mating edge 328 includes a bottom groove 336. The second part top mating edge 330 includes a top tongue 338 and the second part bottom mating edge 332 includes a bottom tongue 340. To facilitate connection of the first part 310 with the second part 312, the top tongue 338 of the second part top mating edge 330 of the second part 312 is inserted into the top groove 334 of the first part top mating edge 326 of the first part 310 and the bottom tongue 340 of the second part bottom mating edge 332 of the second part 312 is inserted into the bottom groove 336 of the first part bottom mating edge 328 of the first part 310. However, it is contemplated that the first part 310 could include tongues and the second part 312 could include grooves or that the first part and the second part could only have abutting edges without tongues and grooves. It is contemplated that electro-static discharge (ESD) can be minimized by use of the top tongue 338 and the bottom tongue 340 being inserted into the top groove 334 and the bottom groove 336, respectively. In one embodiment, the mating tongues and grooves can aid in blocking an ESD spike at a minimum of 15 kV, more preferably at a minimum of 25 kV and most preferably at a minimum of 35 kV. It is contemplated that the tongues and grooves can be connected using the connectors 604 and 605, by an interference fit, and by sonic or vibration welding (to thereby fuse the two-ball connector 300 into a single structure after wire routing (as discussed in more detail below)).

In the illustrated example, the divider 304 of the two-ball connector 300 includes the divider 304 for dividing the wiring passageway 302 into the first wiring passage area 306 and the second wiring passage area 308. In the illustrated example, the divider 304 is integral with the first part 310 of the two-ball connector 300 and extends from an inner surface 305 thereof. Furthermore, when the first part 310 is engaged with the second part 312 of the two-ball connector 300, the divider 304 abuts an inner surface 307 of the second part 312. Therefore, both the first wiring passage area 306 and the second wiring passage area 308 are closed. It is contemplated that the inner surface 307 of the second part 312 could include a channel (either recessed into the inner surface 307 or in a ridge extending from the inner surface 307) for receiving a free end 309 of the divider 304 therein. It is also contemplated that the divider 304 could be integral with the second part 312 instead of the first part 310 or could comprise a separate part configured to be engaged with the first part 310 and/or the second part 312 of the two-ball connector 300. Moreover, it is contemplated that the divider 304 could be spaced from one of the first part 310 or the second part 312 of the two-ball connector 300. Additionally, while the divider 304 is shown as extending down a center of the first part 310 and the second part 312 of the two-ball connector 300, it is contemplated that the divider 304 could be offset such that one of the first wiring passage area 306 and the second wiring passage area 308 is larger than the other of the first wiring passage area 306 and the second wiring passage area 308.

Figure 5:
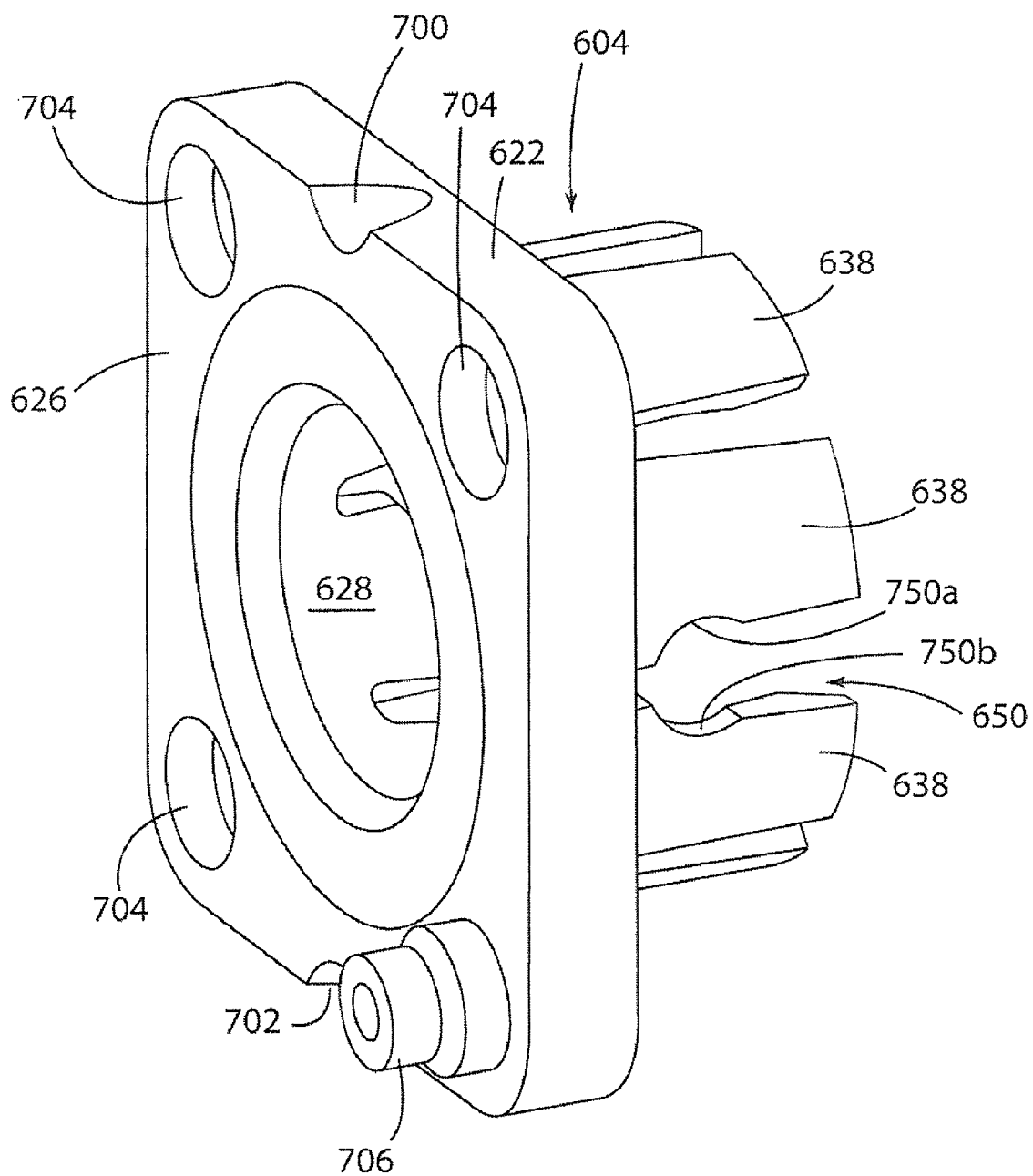
FIG. 5 is a perspective view of a receiver of the rearview assembly of the present invention.
Figure 6:
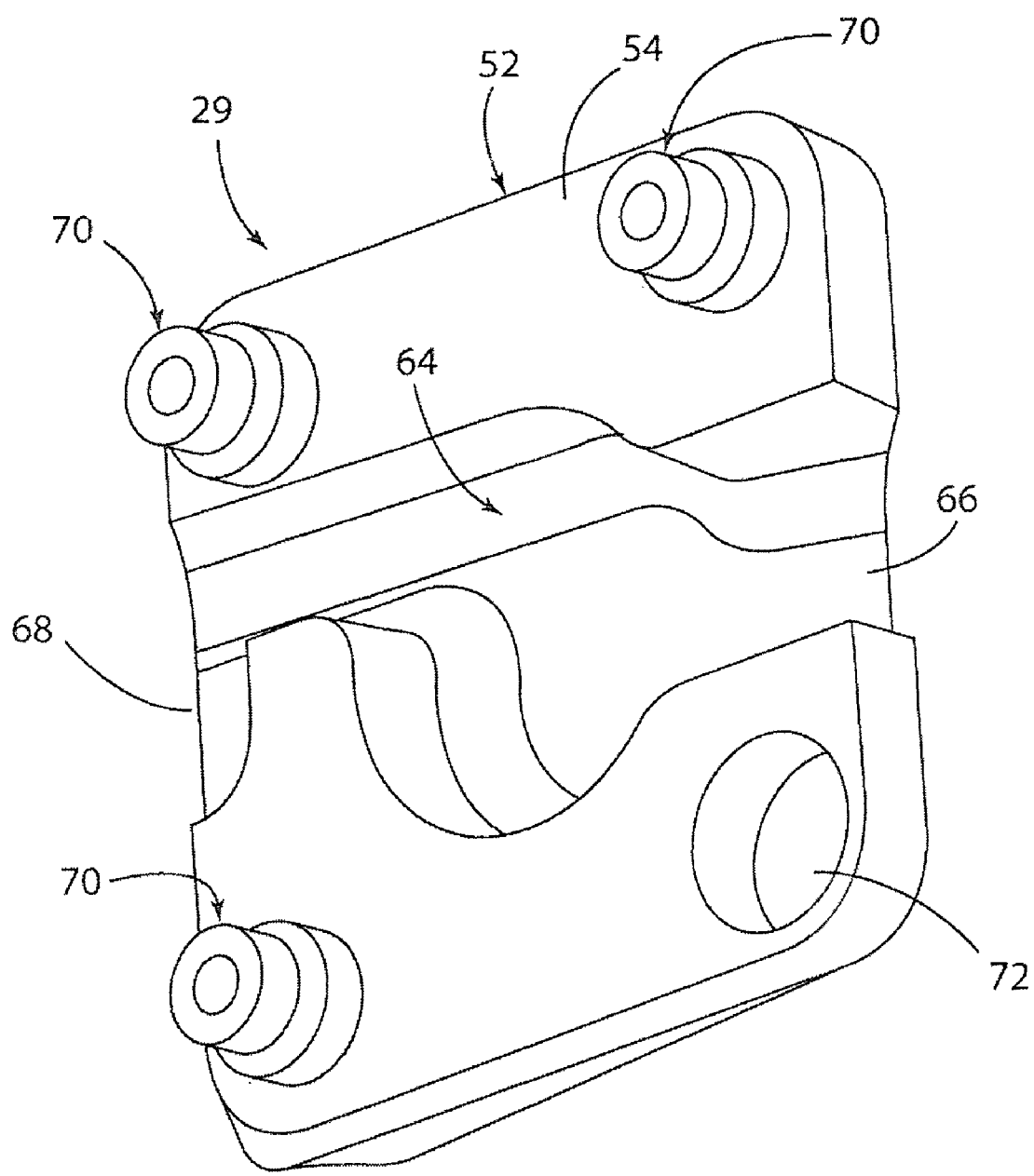
FIG. 6 is a perspective view of a mount of the rearview assembly of the present invention.

The illustrated first receiver 604 and second receiver 606 are configured to receive the first ball 610 and the second ball 612 of the two-ball connector 300. In the illustrated example, the first receiver 604 and second receiver 606 are substantially identical. Accordingly, only the first receiver 604 (FIGS. 1-5, 5 and 7-9) will be discussed, with the understanding that the second receiver 606 can include all of the same features and function in the same manner as the first receiver 604. The receiver 604 includes a substantially rectangular plate 622 having a front side 624, a rear side 626 and a central opening 628. As illustrated in FIG. 5, the rear side 626 of the plate 622 includes an opening 704 located at three corners of the plate 622 and a post 706 at one corner of the plate 622. The post 706 can be circular or any other geometric shape and can be cylindrical, tapered or stepped. Likewise, the opening 704 can be circular or any other geometric shape and can be cylindrical, tapered or stepped. As discussed in more detail below, the post 706 is configured to be inserted into the connection assembly 40 or the rear housing section 34 and the openings are configured to receive a portion of the connection assembly 40 or the rear housing member 34 to assist in linking first receiver 604 with mount 29 and the second receiver 606 with the rear housing section 34. While one post 706 and three openings 704 are illustrated as forming a rectangle, it is contemplated that any number of posts 706 and openings 704 could be used (including only posts 706 or only openings 704) and that the posts 706 and openings 704 could be in any location on the front side 624 of the rectangular plate 622 of the first receiver 604.

Figure 7:
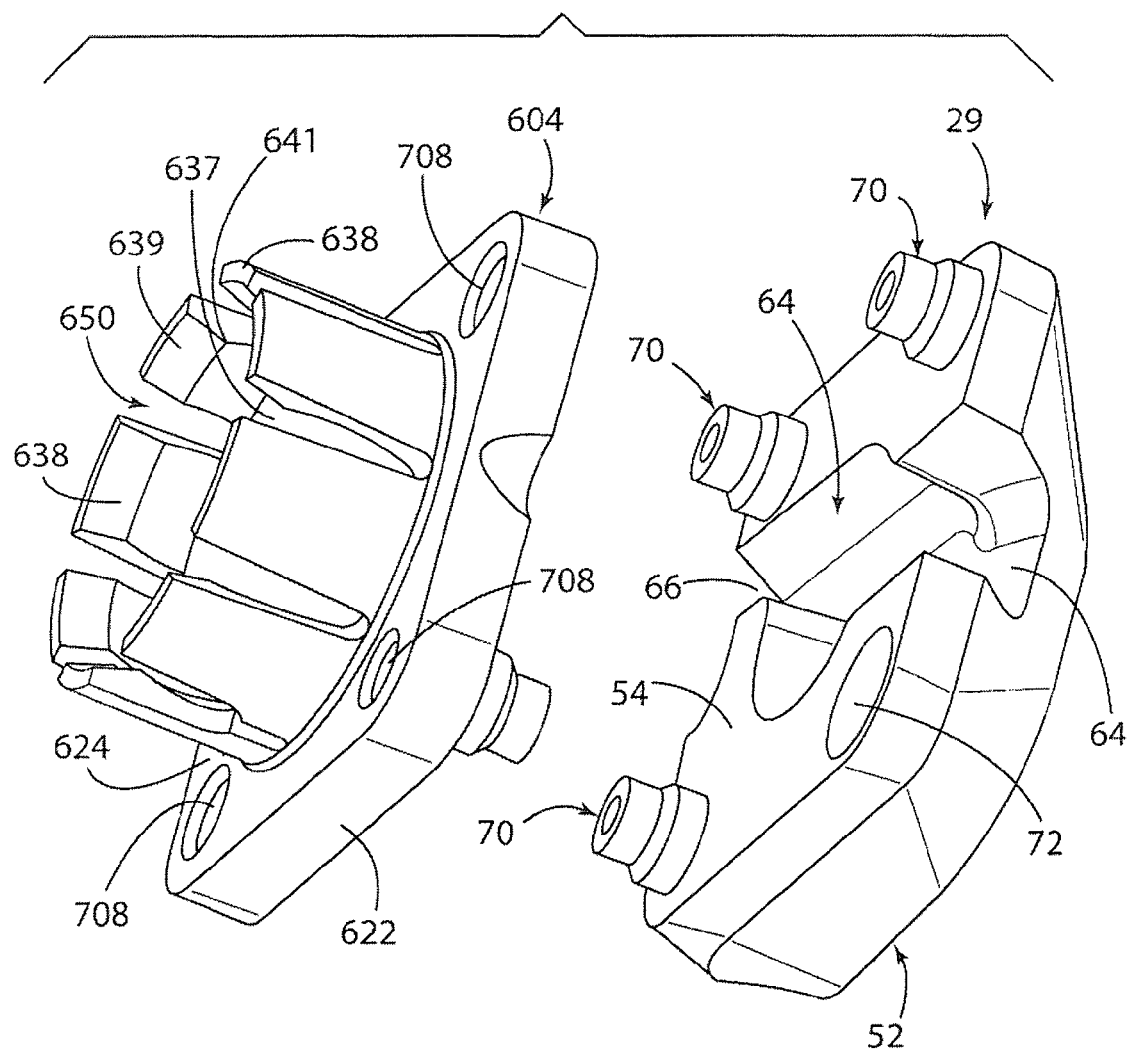
FIG. 7 is a perspective view of the receiver and the mount of the rearview assembly of the present invention.
Figure 8:
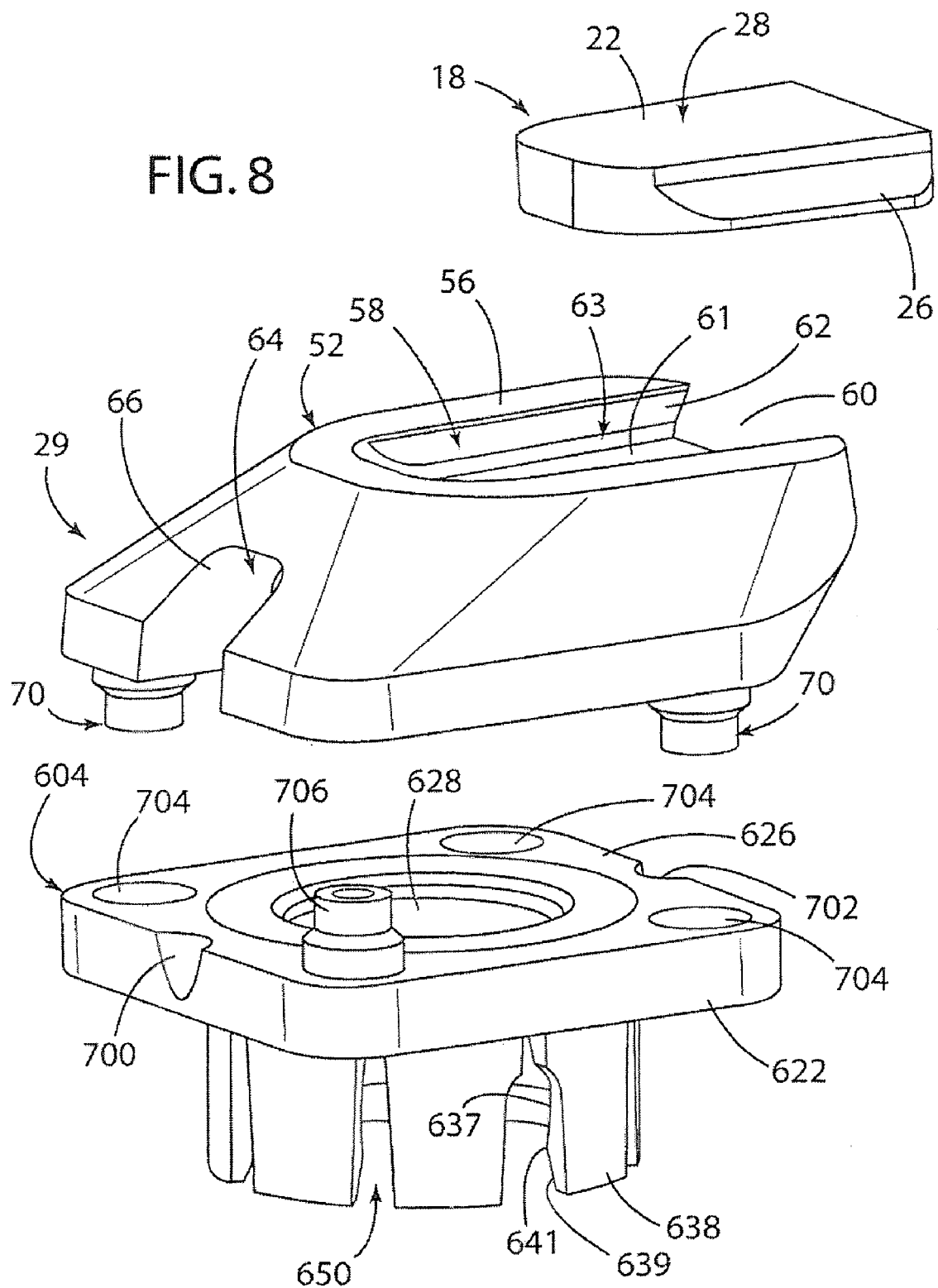
FIG. 8 is an exploded perspective view of a button, the receiver and the mount of the rearview assembly of the present invention.

As illustrated in FIG. 7, the front side 624 of the plate 622 also includes a plurality of openings 708 at corners of the plate 622 for accepting screws therein for connecting the receiver 604 to the mount 29 and/or the rear housing section 34. It is also contemplated that the receiver 604 could be connected to the mount 29 and/or the rear housing section 34 using at least one of a plurality of methods (e.g., screws, heat stakes, etc.) A plurality of fingers 638 extend from the front side 624 of the plate 622, with the fingers 638 surrounding the central opening 628. As illustrated in FIGS. 7-9, each of the fingers 638 includes a curved portion 637, an upper angled portion 639 and a projection 641 located between the curved portion 637 and the upper angled portion 639.

The illustrated rearview assembly 10 is configured to be assembled by engaging the rearview housing 12, the connection assembly 40 and the mount 29 together. The connection assembly 40 can be connected to the mount 29 by inserting the posts 70 of the mount 29 into the openings 704 in the rectangular plate 622 of the first receiver 604 and by inserting the post 706 of the first receiver 604 into the hole 72 in the mount 29. The mount 29 can therefore be connected to the first receiver 604 of the connection assembly 40 through any means (e.g., interference fit, heat staking, adhesive, fasteners inserted through the openings 708 in the first receiver 604 and into the mount 29, etc.). It is also contemplated that the mount 29 could be formed integrally with the first receiver 604 or that the first receiver 604 could be molded over the mount 29. Furthermore, as discussed above, the mount 29 could have any number of posts 70 and holes 72 and the first receiver 604 could have any number of posts 706 and openings 704. However, it is contemplated that the number of posts 70 of the mount 29 could equal the number of openings 704 in the first receiver 604 and the number of holes 72 in the mount 29 could equal the number of posts 706 of the first receiver 604. Moreover, it is contemplated that the number and position of the posts 70 and holes 72 in the mount 29 and the number and position of the posts 706 and openings 704 in the first receiver 604 can be selected to ensure that the first receiver has a certain orientation. For example, as illustrated, since the first receiver 604 only has one post 706, the first receiver 604 can only have one orientation on the mount 29 as the mount 29 only has one hole 72 for receiving the post 706 of the first receiver 604. It is contemplated that the mount 29 could be connected with the first receiver 604 by other means (any connection (fasteners, adhesive, etc.) or by making the first receiver 604 and the mount 29 integral).

In the illustrated example, the two-ball connector 300 is connected to the mount 29 via the first receiver 604. However, the first part 310 of the two-ball connector 300 can be engaged with the second part 312 of the two-ball connector 300 before the two-ball connector 300 is engaged with the first receiver 604 (or the second receiver 606 as discussed in more detail below). In the illustrated example, the first ball 610 of the two-ball connector 300 is configured to be engaged with the first receiver 604 by inserting the first ball 610 within a ball receiving area 650 defined by the fingers 638 to connect the two-ball connector 300 to the first receiver 604. As the first ball 610 is inserted into the ball receiving area 650, the first ball 610 will abut against the upper angled portion 639 of the fingers 638 to spread the fingers 638 apart. Once the first ball 610 has passed the projection 641, the fingers 638 will snap back towards their original position, with the first ball 610 being trapped on the curved portion 637 of the fingers 638.

The illustrated two-ball connector 300 is maintained in contact with the first receiver 604 using the first spring 605 (see FIG. 9). In the illustrated example, the first spring 605 is positioned over the fingers 638 before the first ball 610 has been inserted into the ball receiving area 650. The fingers 638 thereby deflect outward against the bias of the first spring 605 as the first ball 610 is inserted into the ball receiving area 650 as discussed above.

In the illustrated example, the two-ball connector 300 is also engaged with the second receiver 606. The second ball 612 of the two-ball connector 300 is configured to be engaged with the second receiver 606 by inserting the second ball 612 within the ball receiving area 650 defined by the fingers 638 to connect the two-ball connector 300 to the second receiver 606. As the second ball 612 is inserted into the ball receiving area 650, the second ball 612 will abut against the upper angled portion 639 of the fingers 638 to spread the fingers 638 apart. Once the second ball 612 has passed the projection 641, the fingers 638 will snap back towards their original position, with the second ball 612 being trapped on the curved portion 637 of the fingers 638.

The illustrated two-ball connector 300 is maintained in contact with the second receiver 606 using the second spring 607 (see FIG. 9). In the illustrated example, the second spring 607 is positioned over the fingers 638 before the second ball 612 has been inserted into the ball receiving area 650. The fingers 638 thereby deflect outward against the bias of the second spring 607 as the second ball 612 is inserted into the ball receiving area 650 as discussed above.

In the illustrated example, the first receiver 604 and the second receiver 606 are made of polypropylene. With the first receiver 604 and the second receiver 606 being made of polypropylene, the fingers 638 of the receiver can be made thinner than fingers used for receiving balls of the prior art. Furthermore, in the prior art, to change the force of the spring against any fingers of a ball receiver (typically on the connector as discussed above), the inner diameter of the spring would be changed. However, since the fingers 638 are thinner and the material of the fingers 638 is now more flexible, the spring 648 can change the force applied to the first ball 610 or the second ball 612 by changing the gauge (i.e., thickness of the wire forming the spring 648) of the spring 648 alone. Nevertheless, it is noted that both the gauge and the inner diameter of the spring 648 could be altered or the inner diameter alone could be altered to change the force of the fingers 638 against the first ball 610 or the second ball 612. Moreover, the materials used to make the first receiver 604 and the second receiver 606 are also more stable during changes in temperature.

To complete the assembly of the rearview assembly 10, the second receiver 606 is connected to the rear housing section 34 of the housing 12. The second receiver 606, and thereby the connection assembly 40, can be connected to the rear housing section 34 in a manner similar that the mount 29 is connected to the first receiver 604. The second receiver 606 can be connected to the rear housing section 34 by inserting the second receiver 606 and the second spring 607 within the rear housing section 34 (see FIGS. 1-3 and 9) and connected thereto. For example, tubes 802 extending from an inside of the rear housing section 34 can be inserted into openings 708 in the second receiver 606 and fasteners can be inserted through the openings 708 in the second receiver 606 and into the tubes 802 to connect the second receiver 606 to the rear housing section 34. It is contemplated that the housing 12 can be connected to the second receiver 606 of the connection assembly 40 through any means (e.g., interference fit, heat staking, adhesive, the fasteners inserted through openings 708 in the second receiver 606 and into tubes 802 in the rear housing section 34, etc.). It is also contemplated that the second receiver 606 and the rear housing section 34 could have mating posts and openings like the posts and openings used for engagement and orientation with the mount 29 and first receiver 604.

In the illustrated example, it is contemplated that the angles of rotation of the first ball 610 and/or the second ball 612 of the two-ball connector 300 could be limited to certain angles. For example, it is contemplated that the first ball 610 could be limited to a single axis of rotation (for example, to ensure that the rearview assembly 10 does not abut or interfere with a sun visor in a vehicle). As illustrated in FIGS. 1-4, the first ball 610 of the two-ball connector 300 can include a first pivot pin 350a on the first part, first ball half-shell 314 of the first part 310 of the two-ball connector 300 and a second pivot pin 350b on the second part, first ball half-shell 320 of the two-ball connector 300. The first pivot pin 350a and the second pivot pin 350b allow the first ball 610 to pivot about a single axis of rotation with the first receiver 604. As illustrated in FIG. 5, a pair of adjacent fingers 638 of the first receiver 604 include a first arcuate notch 750a and a second arcuate notch 750b on each side of the first receiver 604. Therefore, as the first ball 610 of the two-ball connector 300 is inserted into the ball receiving area 650 of the first receiver 604, the first pivot pin 350a and the second pivot pin 350b can be located between the first arcuate notch 750a and the second arcuate notch 750b. Accordingly, the first pivot pin 350a, the second pivot pin 350b, the two first arcuate notches 750a and the two second arcuate notches 750b allow the first ball 610 to pivot only about one axis of rotation.

It is noted that the illustrated second ball 612 of the two-ball connector 300 does not have any pivot pins. Therefore, the second ball 612 is allowed to rotate in any direction within the second receiver 606. However, since the first receiver 604 can be identical to the second receiver 606, it is contemplated that the two-ball connector 300 and/or the first receiver 604 and the second receiver 606 could have a configuration to prevent improper orientation of the two-ball connector 300. For example, the first pivot pin 350a and the second pivot pin 350b along with the two areas defined by the first notch 750a and the second notch 750b could have different diameters or sizes such that the first ball 610 of the two-ball connector 300 could only be inserted into the first receiver 604 or the second receiver 606 in a certain manner. Since the posts 706 and/or holes 704 of the receivers 604 and 606 allow the receivers 604 and 606 to be orientated in a certain direction on the mount 29 and the rear housing section 34, if one attempted to place the first ball 610 into the second receiver 606, the first pivot pin 350a and the second pivot pin 350b would only allow the two-ball connector 300 to be orientated upside down (e.g., the bend of the center tubular section 608 would be concave downward instead of concave upward). Therefore, the diameters or sizes of the first pivot pin 350a and the second pivot pin 350b along with the two areas defined by the first notch 750a and the second notch 750b could ensure that the first ball 610 is the ball with the single axis of rotation. It is also contemplated that the first ball 610 could have a different size than the second ball 610 along with the ball receiving area 650 of the first receiver 604 having a different size than the ball receiving area 650 of the second receiver 606 to ensure proper orientation of the two-ball connector 300. Moreover, it is contemplated that the first ball 610 and the first receiver 604 could be connected in any manner that allows the first ball 610 to pivot within the first receiver 604 along a single axis of rotation (e.g., the first ball could be non-spherical (for example, cylindrical) with a pair of pivot pins extending from sides thereof). It is also contemplated that the first receiver 604 could have pivot pins and the first ball 610 could have openings for receiving the pivot pins of the first receiver 604 for allowing the first ball 610 to rotate about a single axis of rotation.

The illustrated wiring 50 can be routed through the mount 29 and the first receiver 604. As illustrated in FIG. 9, first wiring 390 of the wiring 50 is routed through the top entry 66 of the channel 64 of the mount 29 and through the central opening 628 of the rectangular plate 622 of the first receiver 604. As illustrated in FIG. 5, the rectangular plate 622 could include a top notch 700 configured to be located over the top entry 66 to allow the first wiring 390 to be easily routed into the channel 64 from outside the mount 29. Furthermore, second wiring 392 of the wiring 50 is routed through the bottom entry 68 of the channel 64 of the mount 29 and through the central opening 628 of the rectangular plate 622 of the first receiver 604. As illustrated in FIG. 5, the rectangular plate 622 could include a bottom notch 702 configured to be located over the bottom entry 68 to allow the second wiring 392 to be easily routed into the channel 64 from outside the mount 29. The first wiring 390 and the second wiring 392 can then be routed through or inserted into the two-ball connector 300. For example, the wiring 50 can be laid on the first part 310 or the second part 312 of the two-ball connector 300, with the first wiring 390 being inserted into the first wiring passage area 306 and the second wiring 392 being inserted into the second wiring passage area 308. Therefore, the first wiring 390 will be separated from the second wiring 392 in the wiring passageway 302 by the divider 304. The first part 310 of the two-ball connector 300 is then engaged with the second part 312 of the two-ball connector 300. The two-ball connector 300 can then be engaged with the first receiver 604 as discussed above. Moreover, the first wiring 390 and the second wiring 392 can be routed through the central opening 628 of the rectangular plate 622 of the second receiver 606 and through an opening 800 in the rear housing section 34 (and to further connections within the housing 12).

As aspect of the present invention is to maintain the first wiring 390 and the second wiring 392 to prevent electromagnetic interference between the first wiring 390 and the second wiring 392. The divider 304 within the two-ball connector 300 assists in preventing electromagnetic interference between the first wiring 390 and the second wiring 392. It is further contemplated that the divider 304 could include an electromagnetic interference prevention component (e.g., film, foil or metalized surface) for preventing electromagnetic interference between the first wiring 390 and the second wiring 392 with the two-ball connector 300.

Furthermore, it is contemplated that the interaction of balls of the two-ball connector 300, the curved fingers 637 of the receivers 604 and 606 and an inside diameter of the springs 605 and 607 can have a distinct relationship based upon the surface area of contact. The surface area of contact varies based upon the size of a diameter of the balls of the two-ball connector 300 less surface deviations for manufacturing or desired features and the corresponding socket defined by the curved fingers 637 of the receivers 604 and 606. The sq/mm of the contacting surfaces coupled with an inward pressure exerted by the expanded springs 605 and 607 allows for the adjustment of the positioning torque of the rearview assembly. It is contemplated that the contacting surface area of a 22 mm pivot ball and the corresponding socket be approximately 550 sq/mm coupled with an appropriately sized spring will develop adjustment torque from about 1 newton/meter to about 4 newtons/meters or values within those ranges. It is further contemplated that increasing the a diameter of the pivot ball to 28 mm (about 786 sq/mm contacting surface) or larger would allow for better torque control, wire management and increased rearview feature installation.

Figure 10:
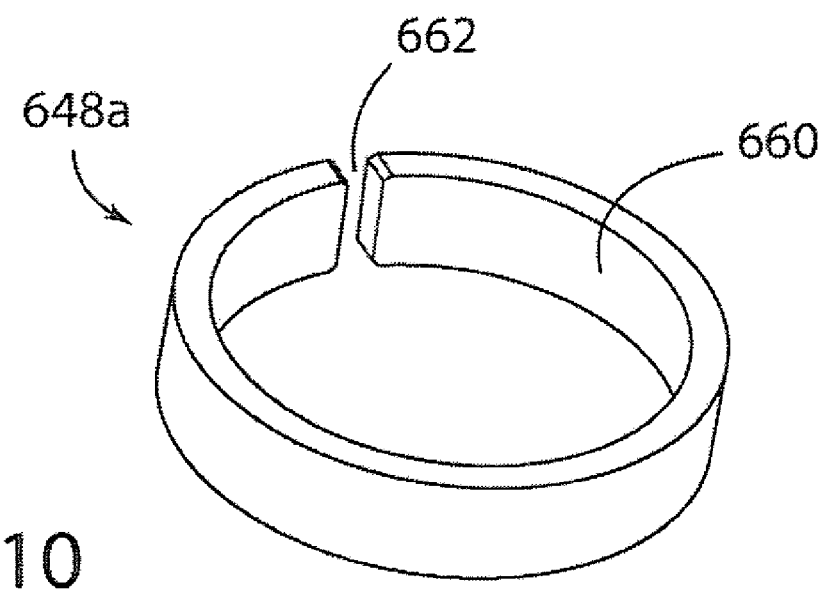
FIG. 10 is a perspective view of an alternative spring according to the present invention.

FIG. 10 illustrates another embodiment of a spring 648a that can be used with the first receiver 604 and the second receiver 606 of the present invention. The spring 648a comprises a unitary ring-shaped body 660 having a split 662 for allowing the spring 648a to fit around the fingers 638. The spring 648a can be made in any manner. For example, the spring 648a can be stamped, rolled or made from compressed powered metal. The resiliency of the spring 648a can be tuned by changing the thickness of the ring-shaped body 660, by changing the material of the spring 648a and/or by heat treating the spring 648a.

Figure 11:
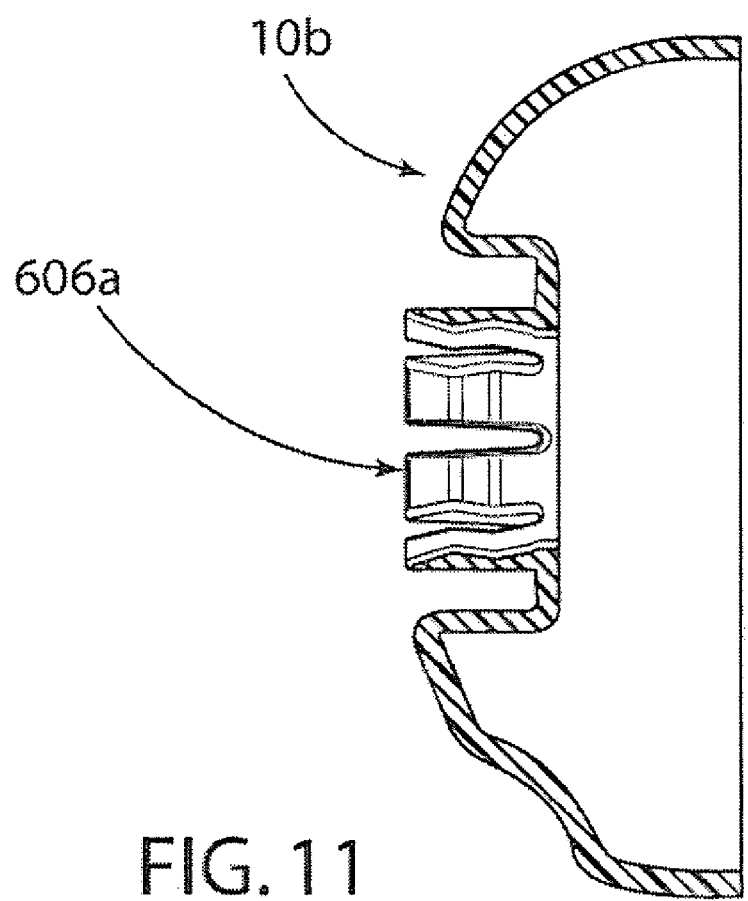
FIG. 11 is a cross-sectional view of a one-piece housing and receiver according to the present invention.
Figure 12:
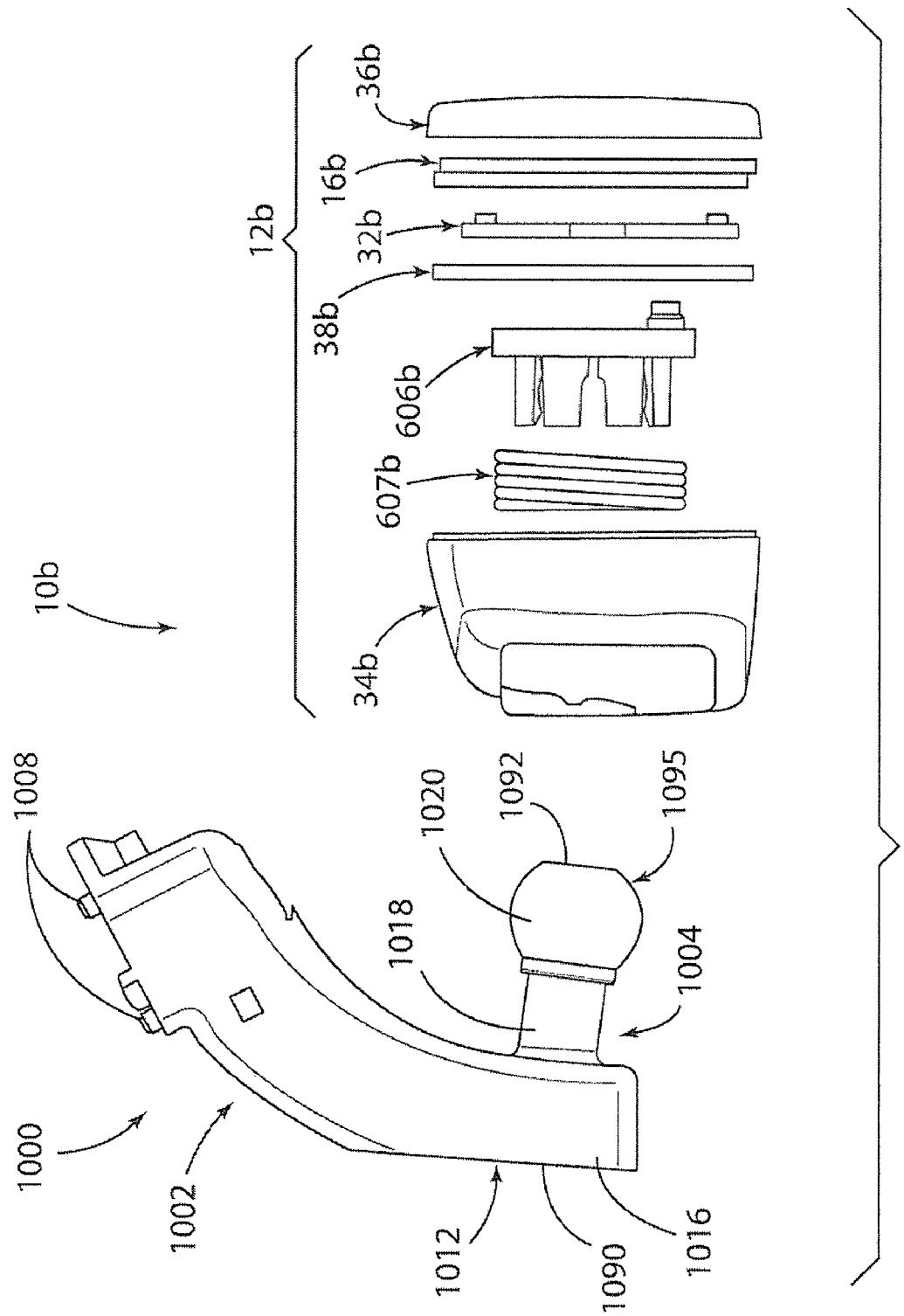
FIG. 12 is an exploded side view of a third embodiment of the rearview assembly of the present invention.
Figure 13:
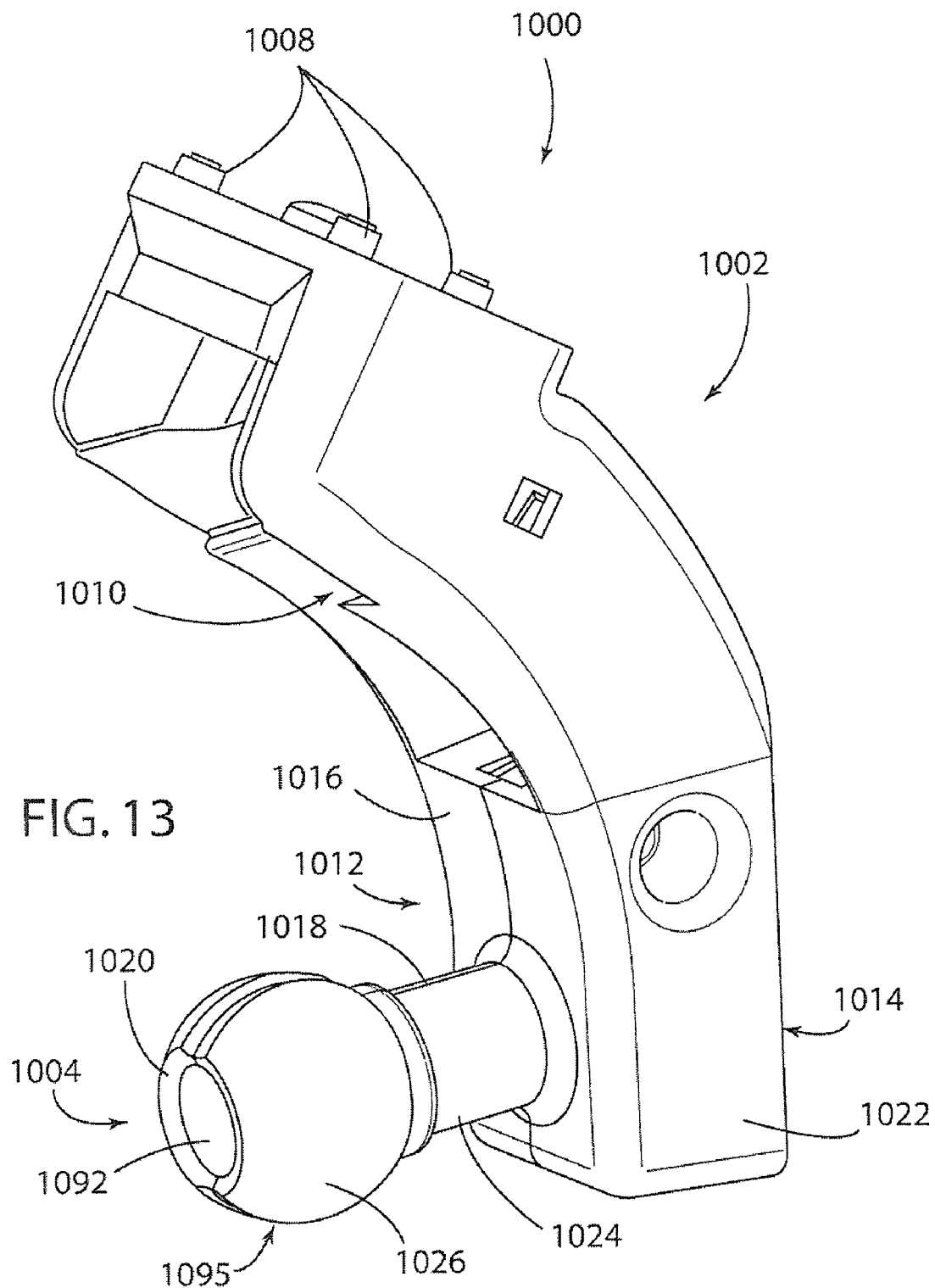
FIG. 13 is a front perspective view of a connector assembly of the third embodiment of the rearview assembly of the present invention.
Figure 14:
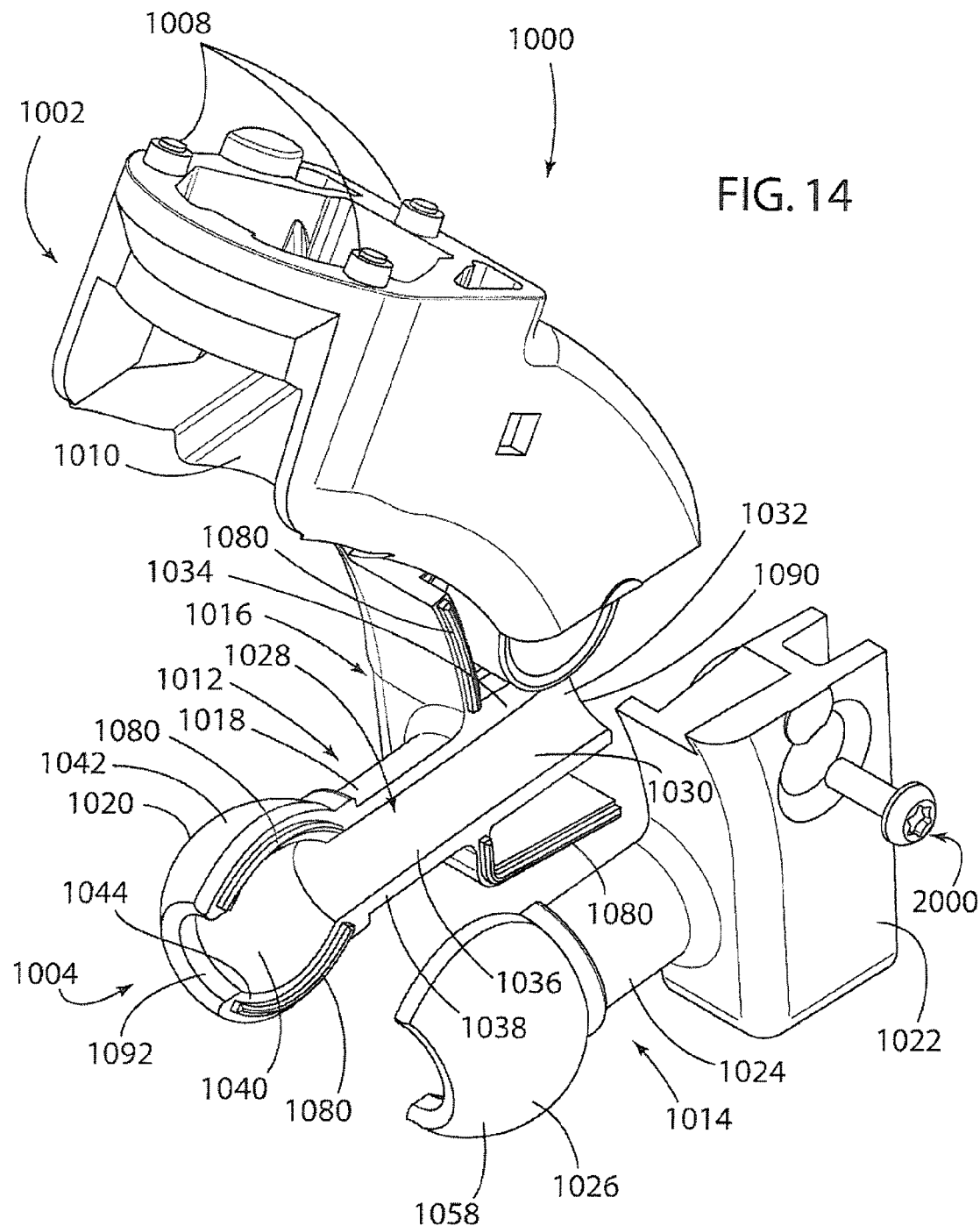
FIG. 14 is a front exploded perspective view of the connector assembly of the third embodiment of the rearview assembly of the present invention.
Figure 15:
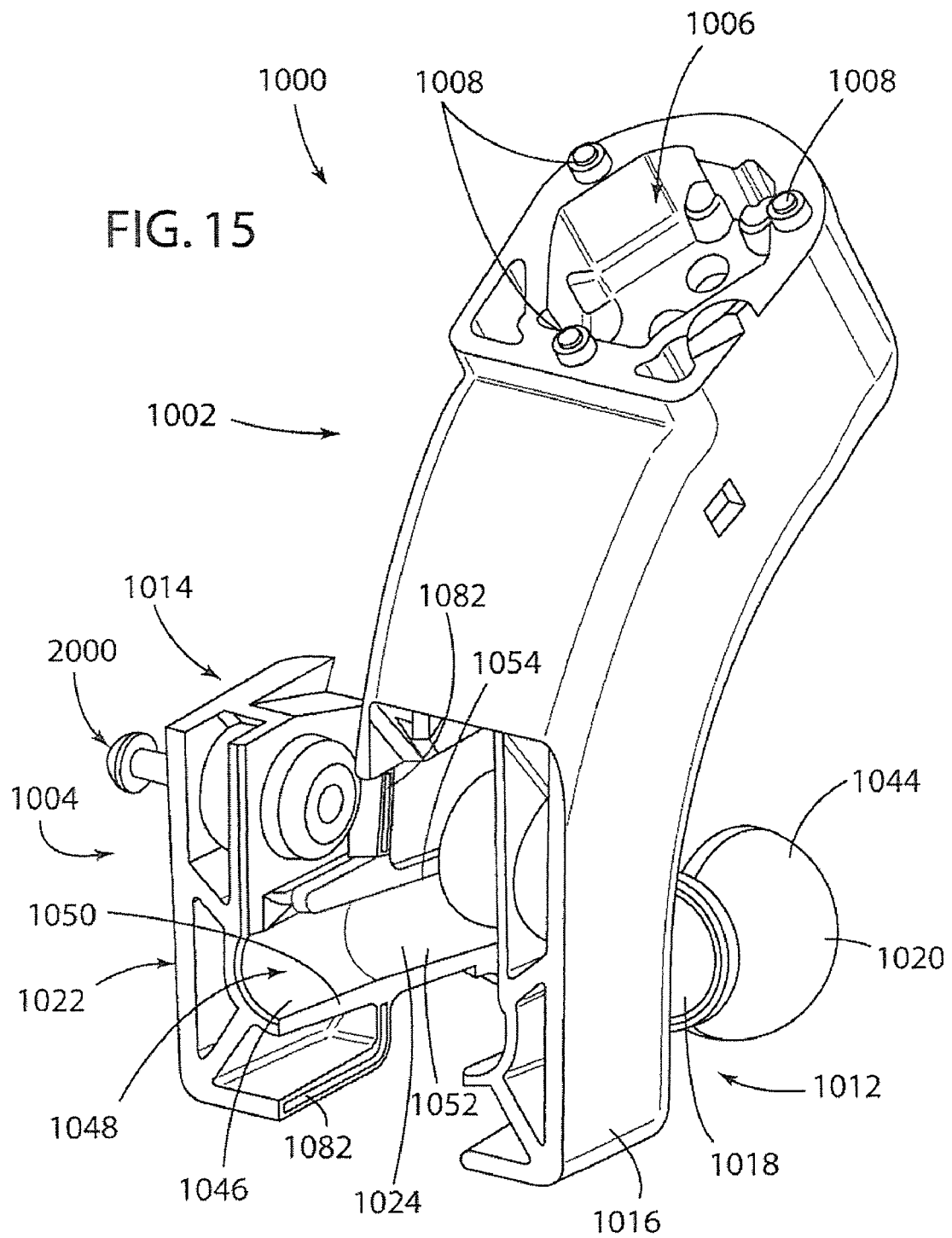
FIG. 15 is a rear exploded perspective view of the connector assembly of the third embodiment of the rearview assembly of the present invention.
Figure 16:
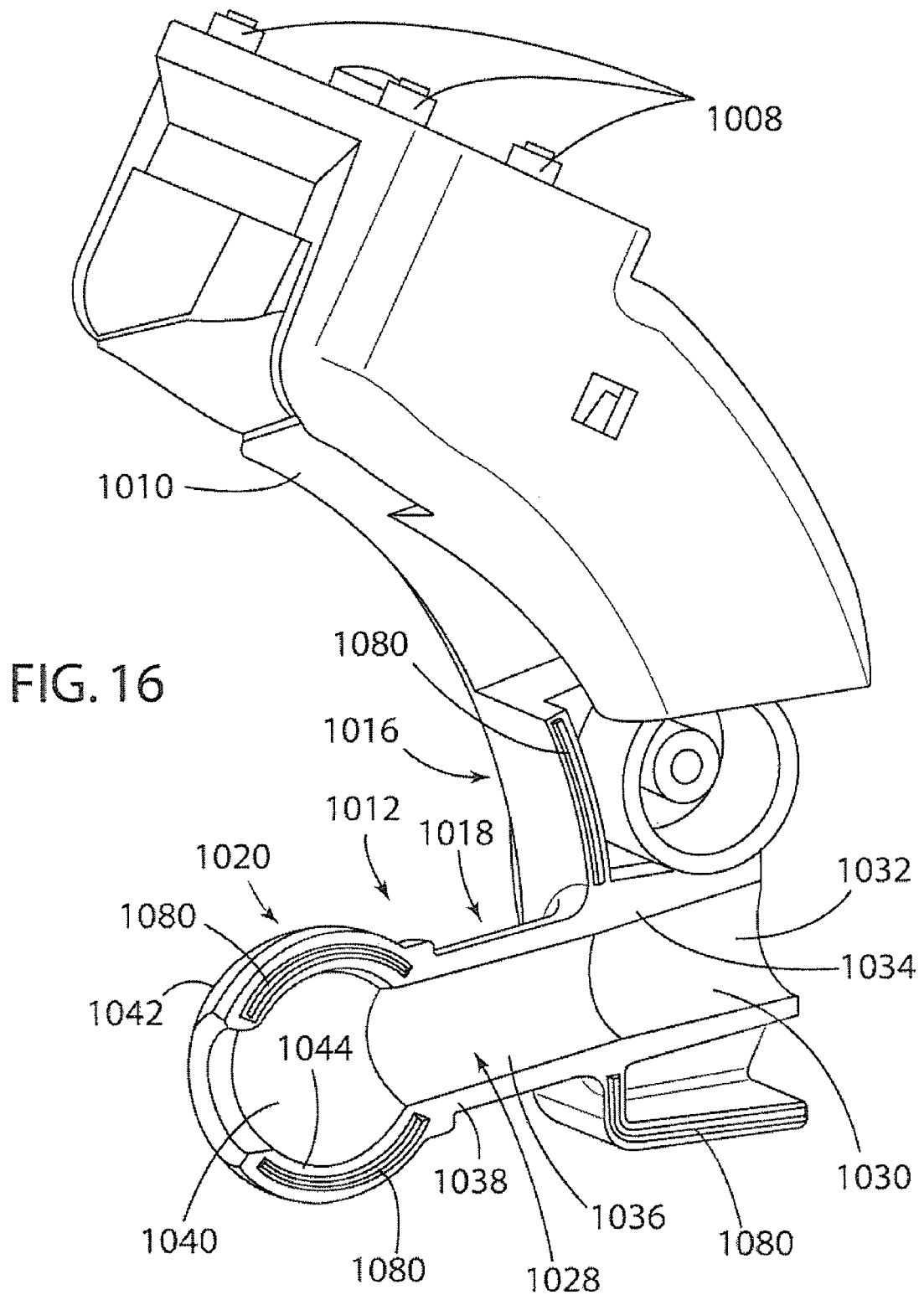
FIG. 16 is a front perspective view of a first member of the connector assembly of the third embodiment of the rearview assembly of the present invention.
Figure 17:
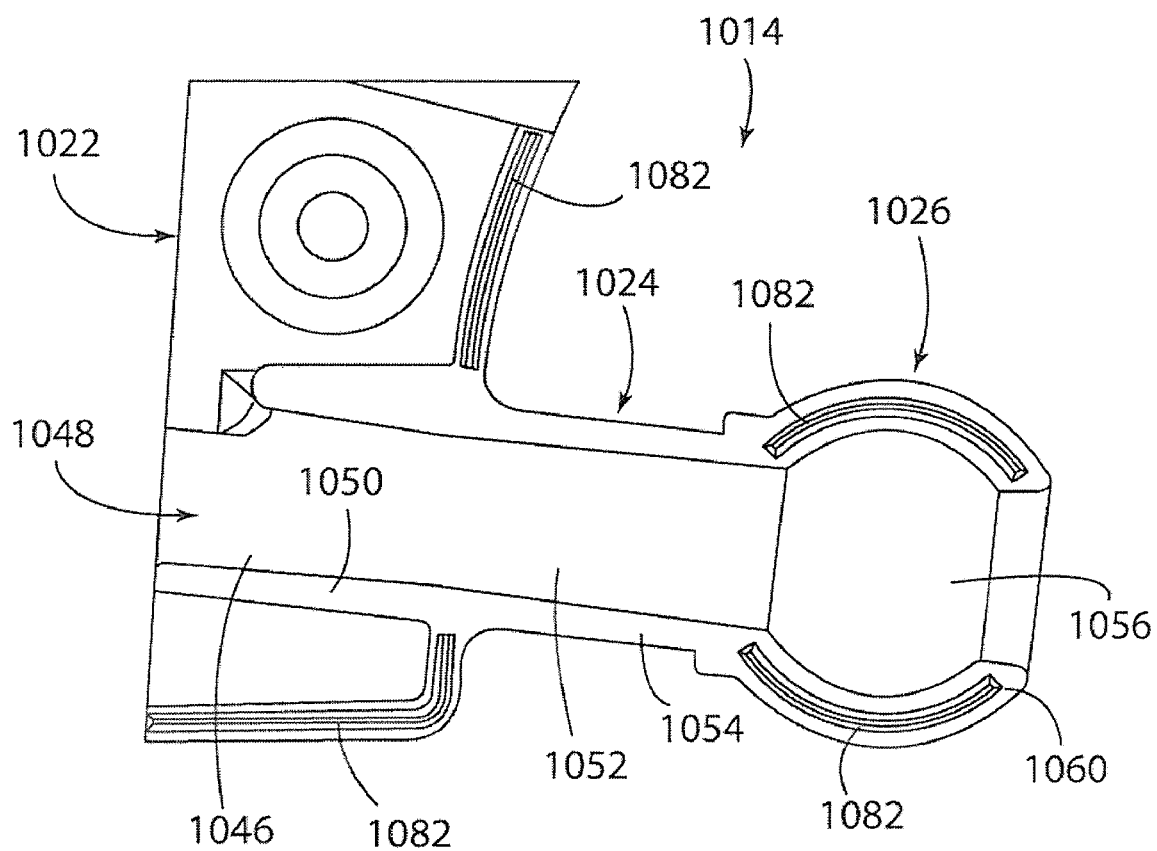
FIG. 17 is a side view of a second member of the connector assembly of the third embodiment of the rearview assembly of the present invention.

FIG. 11 illustrates an embodiment of the interior rearview assembly 10a of the present invention wherein the second receiver 606a is integral with the rear housing member.

It is contemplated that the first receiver 604 could be made integral with the mount in the same manner. Moreover, it is contemplated that the connector, instead of having two balls, could only include one ball. For example, the mount or the rear housing member could include a ball and the connector could include a socket and one ball. Furthermore, it is contemplated that the mount could include a ball, with the ball of the mount being connected to the rear housing member using the receiver as discussed above (or vice versa, with the rear housing member having a ball and the mount including a receiver as discussed above).

The reference numeral 10b (FIGS. 12-17) generally designates another embodiment of the present invention, having a third embodiment for the rearview assembly. Since rearview assembly 10b is similar to the previously described rearview assembly 10a, similar parts appearing in FIGS. 1-9 and FIGS. 12-17, respectively, are represented by the same, corresponding reference number, except for the suffix "b" in the numerals of the latter. The rearview assembly 10b can include the rearview housing 12b with the circuit board 38b, the carrier plate 32b and the rearview element 16b within the rear housing section 34b and the bezel 36b as in the first embodiment of the rearview assembly 10 (or without some of these elements). The third embodiment of the rearview assembly 10b can also include the second receiver 606b and the second spring 607b as in the first embodiment of the rearview assembly 10b. However, the third embodiment of the rearview assembly 10b includes a single ball mount connector assembly 1000 instead of the mount 29, the first receiver 604, the first spring 605 and the two-ball connector 300 of the first embodiment of the rearview assembly 10.

The illustrated single ball mount connector assembly 1000 is configured to connect the rearview housing 12b to the vehicle. The single ball mount connector assembly 1000 includes a mounting portion 1002 and a wiring portion 1004. The mounting portion 1002 is configured to connect the single ball mount connector assembly 1000 to the vehicle and the wiring portion 1004 is configured to have wiring routed therethrough and to the rearview housing 12b. The wiring portion 1004 is also configured to support the rearview housing 12b.

In the illustrated example, the mounting portion 1002 of the single ball mount connector assembly 1000 is configured to be connected to the vehicle. For example, the mounting portion 1002 can be connected to a windshield of the vehicle using a button (not shown) or can be connected to a headliner. The structure and manner of affixing the mounting portion 1002 of the single ball mount connector assembly 1000 to a windshield or headliner are well known to those skilled in the art. For example, a clip (not shown) can be inserted into a top opening 1006 of the mounting portion 1002, with the clip being inserted over a button and the single ball mount connector assembly 1000 rotated to connect the single ball mount connector assembly 1000 to a button (using projections 1008 to assist in maintaining the single ball mount connector assembly 1000 connected to the button). The use of a clip and the projections 1008 to connect the single ball mount connector assembly 1000 to a button is well known to those skilled in the art. It is contemplated that the mounting portion 1002 could have any configuration for connecting the mounting portion 1002 to the vehicle and can include an area 1010 for a rain sensor, headlight detector, or other electronic device (not shown).

The illustrated wiring portion 1004 of the single ball mount connector assembly 1000 is connected to the mounting portion 1002 of the single ball mount connector assembly 1000. The wiring portion 1004 is configured to have wiring routed therethrough and to support the rearview housing 12b. In the illustrated embodiment, the wiring portion 1004 comprises a first part 1012 integral with the mounting portion 1002 of the single ball mount connector assembly 1000 and a second part 1014 removably connected to the first part 1012. The first part 1012 of the wiring portion 1004 includes a first base 1016 integral with the mounting portion 1002, a first neck section 1018 and a ball first portion 1020. The second part 1014 of the wiring portion 1004 includes a second base 1022, a second neck section 1024 and a ball second portion 1026. The first base 1016, the first neck section 1018 and the ball first portion 1020 of the first part 1012 are configured to engage the second base 1022, the second neck section 1024 and the ball second portion 1026 of the second part 1014, respectively.

In the illustrated example, the first part 1012 of the wiring portion 1004 of the single ball mount connector assembly 1000 forms a first portion of a wiring passage 1028 of the wiring portion 1004 of the single ball mount connector assembly 1000. The first base 1016 includes a first half of a rear portion 1030 of a wall 1032 surrounding the wiring passage 1028. The first base 1016 also includes a first peripheral rim 1034 configured to engage the second base 1022. The first neck section 1018 extends from the first base 1016 and further includes a first half of a middle portion 1036 of the wall 1032 surrounding the wiring passage 1028. The first neck section 1018 also includes a first peripheral rim 1038 configured to engage the second neck section 1024. The ball first portion 1020 is connected to an end of the first neck section 1018 opposite the first base 1016. The ball first portion 1020 includes a first half of a front portion 1040 of the wall 1032 surrounding the wiring passage 1028. The ball first portion 1020 includes a substantially spherical outer surface 1042. The ball first portion 1020 also includes a first peripheral rim 1044 configured to engage the ball second portion 1026.

The illustrated second part 1014 of the wiring portion 1004 of the single ball mount connector assembly 1000 is configured to engage the first part 1012 to define the wiring passage 1028. The second base 1022 includes a second half of a rear portion 1046 of a wall 1048 surrounding the wiring passage 1028. The second base 1022 also includes a second peripheral rim 1050 configured to engage the first base 1016. The second neck section 1024 extends from the second base 1022 and further includes a second half of a middle portion 1052 of the wall 1048 surrounding the wiring passage 1028. The second neck section 1024 also includes a second peripheral rim 1054 configured to engage the first neck section 1018. The ball second portion 1026 is connected to an end of the second neck section 1024 opposite the second base 1022. The ball second portion 1026 includes a second half of a front portion 1056 of the wall 1048 surrounding the wiring passage 1028. The ball second portion 1026 includes a substantially spherical outer surface 1058. The ball second portion 1026 also includes a second peripheral rim 1060 configured to engage the ball first portion 1020.

In the illustrated example, wiring can be placed on the wall 1032 of the first part 1012 or the wall 1048 of the second part 1014 and the first part 1012 can be engaged with the second part 1014 to enclose the wiring within the wiring passage 1028. In the illustrated embodiment, to engage the first part 1012 with the second part 1014, the first peripheral rim 1034 of the first base 1016 is abutted against the second peripheral rim 1050 of the second base 1022, the first peripheral rim 1038 of the first neck section 1018 is abutted against the second peripheral rim 1054 of the second neck section 1024, and the first peripheral rim 1044 of the ball first portion 1020 is abutted against the second peripheral rim 1060 of the ball second portion 1026. In the illustrated example, the engagement between the first part 1012 and the second part 1014 forms a plane with engagement along the entire top and bottom of the plane. However, it is contemplated that the engagement between the first part 1012 and the second part 1014 could be along many planes and interrupted. It is contemplated that the first part 1012 can include a ridge 1080 along any part of the first peripheral rim 1034 of the first base 1016, the first peripheral rim 1038 of the first neck section 1018, and the first peripheral rim 1044 of the ball first portion 1020 (either continuous or interrupted) and the second part 1014 could include a channel 1082 along any part of the second peripheral rim 1050 of the second base 1022, the second peripheral rim 1054 of the second neck section 1024, and the second peripheral rim 1060 of the ball second portion 1026 (either continuous or interrupted), with the ridge 1080 being inserted into the channel 1082 when the first part 1012 is engaged with the second part 1014 to facilitate engagement of the first part 1012 with the second part 1014.

When the illustrated first part 1012 and second part 1014 of the wiring portion 1004 of the single ball mount connector assembly 1000 are engaged, the wiring passage 1028 having an entrance 1090 and an exit 1092 is formed. Furthermore, the wiring portion 1004 forms a ball 1095 comprised of the ball first portion 1020 and the ball second portion 1026, with the ball 1095 being configured to be received within the second receiver 606b to connect the single ball mount connector assembly 1000 to the rearview housing 12. It is contemplated that the first part 1012 and the second part 1014 of the wiring portion 1004 of the single ball mount connector assembly 1000 can be maintained in engagement in any manner. For example, a fastener 2000 can be inserted through the second base 1022 of the second part 1014 and into the first base 1016 of the first part 1012 to connect the first part 1012 to the second part 1014. Other methods of connecting the first part 1012 to the second part 1014 can also be used either instead of the fastener 2000 or in combination with the fastener 2000 (e.g., adhesive). It is also contemplated that the wiring portion 1004 could include a divider in the wiring passage 1028 similar to the divider of the first embodiment of the rearview assembly 10.

There are several measurements that can be made to measure the vibration characteristics of a mirror system. The measurements include image excursion and resonate frequency. Image excursion is measured by mounting a sample mirror housing to an appropriate attachment "button" rigidly affixed to a vibration machine. By using this method, differences in any adhesives used by the manufacturers and the adhesive's effect on vibration measurements can be eliminated. A control accelerometer is attached to the vibration machine and a response accelerometer is attached to a center of the reflective surface of the mirror housing. The sample mirror housing is excited at the natural frequency of each primary axis of the sample mirror housing at an amplitude of 0.25 g. The response of the vibration on the mirror housing is tracked by maintaining a 90 degree phase shift from the control accelerometer to the response accelerometer. Testing at resonance allows comparisons to be made on sample mirror housings that display different natural frequencies. During measurement, a collimated laser beam is reflected from the reflective surface to a target. The net length of the reflected laser beam is measured on a target for each direction and the angle from the nominal position is calculated based on the distance from the reflective surface to the target. This angle, or image excursion, is a direct indication of vibration performance as viewed by a user of the mirror system user. Higher natural frequencies and greater damping in the mirror system both lend to lower measured amplitudes and thus better vibration characteristics.

Resonate frequency is also measured by mounting a sample mirror housing to an appropriate attachment "button" rigidly affixed to a vibration machine. By using this method, differences in any adhesives used by the manufacturers and the adhesive's effect on vibration measurements can be eliminated. A control accelerometer is attached to the vibration machine and a response accelerometer is attached to a center of the reflective surface of the mirror housing. The sample mirror housing is subjected to a 0.25 g sinusoidal sweep from 20-200 Hz at a rate of one octave per minute along a single primary axis of the sample mirror housing at an amplitude of 0.25 g. The mirror housing is determined to be in resonance at the lowest 90 degree phase shift from the control accelerometer to the response accelerometer. The resonate frequency is measured independently in the lateral, vertical and longitudinal direction.

The illustrated two-ball connector 300 of the rearview assembly 10 is configured to provide an image excursion performance in the lateral, vertical and longitudinal direction of less than 0.4 mm, more preferably 0.3 mm and even more preferably 0.2 mm with less than 0.1 mm being the most desired. The illustrated two-ball connector 300 of the rearview assembly 10 is also configured to provide a lateral resonate frequency performance of 40 Hz, more preferably of at least about 50 Hz, and even more preferably at least about 60 Hz with greater than 70 Hz being the most desired. The illustrated two-ball connector 300 of the rearview assembly 10 is configured to provide a vertical resonate frequency performance of 60 Hz, more preferably of at least about 70 Hz, and even more preferably at least about 80 Hz with greater than 90 Hz being the most desired. The illustrated two-ball connector 300 of the rearview assembly 10 is configured to provide a longitudinal resonate frequency performance of 80 Hz, more preferably of at least about 120 Hz, with greater than 150 Hz being the most desired.

The illustrated single ball mount connector assembly 1000 of the rearview assembly 10b is configured to provide an image excursion performance in the lateral, vertical and longitudinal direction of less than 0.4 mm, more preferably 0.3 mm and even more preferably 0.2 mm with less than 0.1 mm being the most desired. The illustrated single ball mount connector assembly 1000 of the rearview assembly 10b is configured to provide a lateral resonate frequency performance of 60 Hz, more preferably of at least about 80 Hz, and even more preferably at least about 100 Hz with greater than 120 Hz being the most desired. The illustrated single ball mount connector assembly 1000 of the rearview assembly 10b is configured to provide a vertical resonate frequency performance of 80 Hz, more preferably of at least about 100 Hz, and even more preferably at least about 120 Hz with greater than 140 Hz being the most desired. The illustrated single ball mount connector assembly 1000 of the rearview assembly 10b is configured to provide a longitudinal resonate frequency performance of 80 Hz, more preferably of at least about 120 Hz, with greater than 150 Hz being the most desired.

The reference numeral 10c (FIG. 20) generally designates another embodiment of the present invention, having a fourth embodiment for the rearview assembly. Since rearview assembly 10c is similar to the previously described rearview assembly 10, similar parts appearing in FIGS. 1-9 and FIG. 20, respectively, are represented by the same, corresponding reference number, except for the suffix "c" in the numerals of the latter. The rearview assembly 10c can include the rearview housing 12c with the circuit board, the carrier plate and the rearview element within the rear housing section 34c and the bezel as in the first embodiment of the rearview assembly 10 (or without some of these elements). The fourth embodiment of the rearview assembly 10c includes a single ball connector 250 for connecting the rearview housing 12c to the receiver 604c and the mount 29c.

In the illustrated embodiment, the mount 29c includes a different profile that the first embodiment of the mount 29 as discussed above, but the mount 29c functions in the same manner as the first embodiment of the mount 29. The mount 29c includes a receiving area 63c for receiving the button 18 as described above. The illustrated receiver 604c is connected to the mount 29c by inserting fasteners (not shown) through tubes 299 of the receiver 604c and into the mount 29c. It is contemplated that the receiver 604c could be connected to the mount 29c in other manners (e.g., by welding, snapping or an adhesive). The receiver 604c includes a ball receiving area 650c for receiving a single-ball connector 250 therein.

The illustrated single-ball connector 250 is configured to connect the rearview housing 12c to the receiver 604c. The single-ball connector 250 includes a connection ball 252, a bent connector portion 254 and a mount plate 256. The connection ball 252 is substantially spherical and is configured to be inserted into the receiving area 650c to connect the single-ball connector 250 to the receiver 650c (with the spring 605c surrounding the connector 604c as discussed above). It is contemplated that the connection ball 252 could be any size (e.g., 22 mm or 28 mm diameter). The bent connector portion 254 includes a first section 253 connected to the connection ball 252 and a second section 255 angled relative to the first section 253. The mount plate 256 is disc-shaped and is connected to the second section 255 of the bent connector portion 254. The mount plate 256 includes a central hole 258 and a projection 260. The mount plate 256 connects the single-ball connector 250 to the rearview housing 12c.

Figure 20:
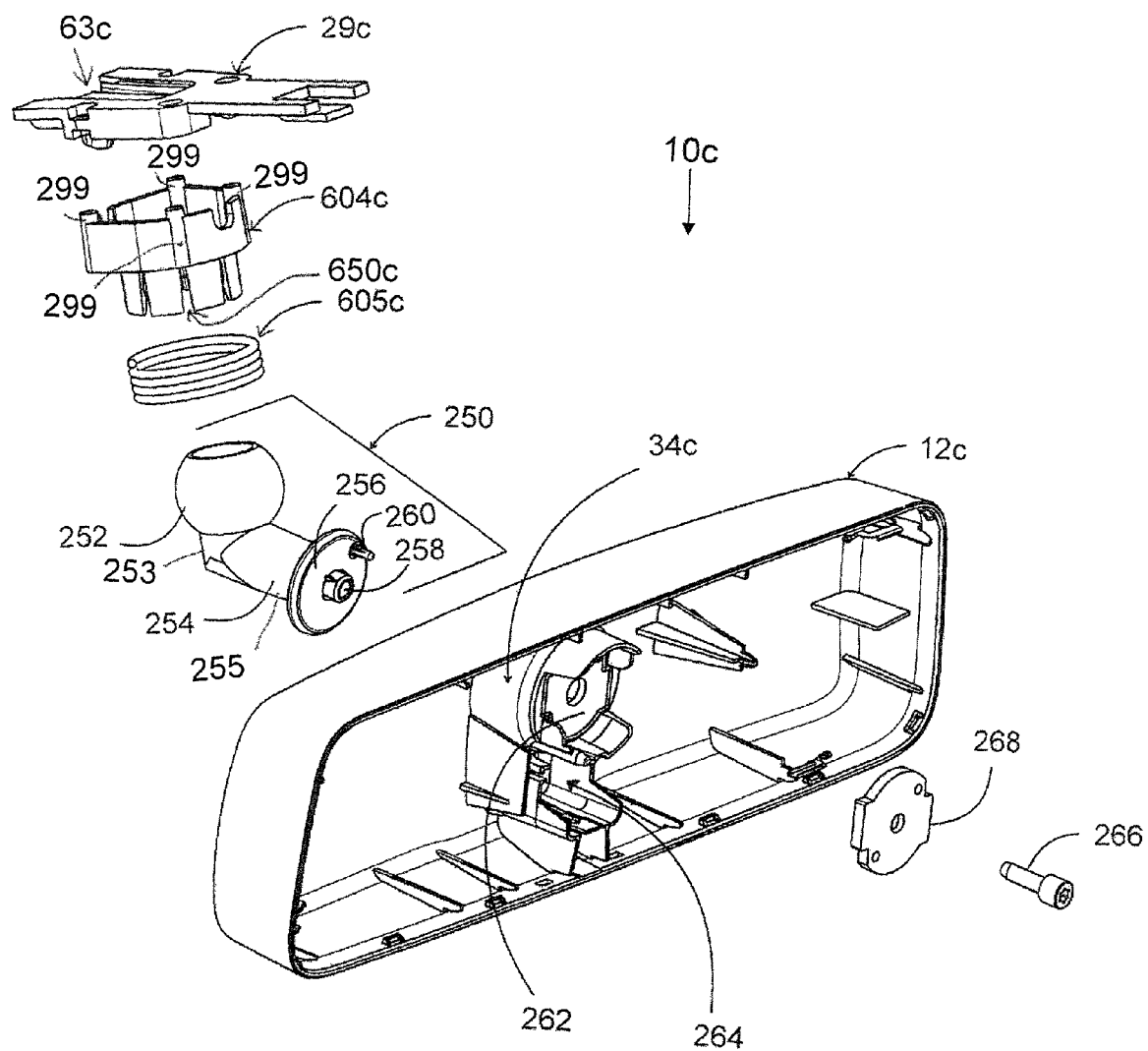
FIG. 20 is an exploded perspective view of a fourth embodiment of the rearview assembly of the present invention.

In the illustrated embodiment, the rearview housing 12c includes a substantially planar mounting area 262 for connecting the rearview housing 12c to the single-ball connector 250. A rear side of the substantially planar mounting area 262 abuts the mount plate 256 of the single-ball connector 250. The rear side of the substantially planar mounting area 262 also includes an opening (not shown) for accepting the projection 260 of the mount plate 256 therein for preventing rotation of the single-ball connector 250 relative to the rearview housing 12c. As illustrated in FIG. 20, a mounting washer 268 is abutted against a front side of the substantially planar mounting area 262 and a fastener 266 is inserted through the mounting washer 268, the substantially planar mounting area 262 of the rearview housing 12c and into the central hole 258 of the mount plate 256 of the single-ball connector 250 to connect the single-ball connector 250 to the rearview housing 12c. It is contemplated that the rearview housing 12c could include an aperture 264 through a rear thereof for accepting wiring (not shown) for engagement with items (not shown) within the rearview housing 12c.

The reference numeral 10d (FIG. 21) generally designates another embodiment of the present invention, having a fifth embodiment for the rearview assembly. Since rearview assembly 10d is similar to the previously described rearview assembly 10, similar parts appearing in FIGS. 1-9 and FIG. 21, respectively, are represented by the same, corresponding reference number, except for the suffix "d" in the numerals of the latter. The rearview assembly 10d can include the rearview housing 12d with the circuit board, the carrier plate and the rearview element within the rear housing section 34d and the bezel as in the first embodiment of the rearview assembly 10 (or without some of these elements). The fifth embodiment of the rearview assembly 10d includes a single ball connector 550 for connecting the rearview housing 12d to the receiver 604d and the mount 29d.

In the illustrated embodiment, the mount 29d includes a different profile that the first embodiment of the mount 29 as discussed above, but the mount 29d functions in the same manner as the first embodiment of the mount 29. The mount 29d includes a receiving area 63d for receiving the button 18 as described above. The illustrated receiver 604d is connected to the mount 29d by inserting fasteners (not shown) through tubes 299d of the receiver 604d and into the mount 29d. It is contemplated that the receiver 604d could be connected to the mount 29d in other manners (e.g., by welding or an adhesive). The receiver 604d includes a ball receiving area 650d for receiving a single-ball connector 550 therein.

The illustrated single-ball connector 550 is configured to connect the rearview housing 12d to the receiver 604d. The single-ball connector 550 includes a connection ball 552, a bent connector portion 554 and a mount plate 556. The connection ball 552 is substantially spherical and is configured to be inserted into the receiving area 650d to connect the single-ball connector 550 to the receiver 650d (with the spring 605d surrounding the connector 604d as discussed above). It is contemplated that the connection ball 552 could be any size (e.g., 22 mm or 28 mm diameter). The bent connector portion 554 comprises a curved tube and is connected to the connection ball 252 at a first end and to the mount plate 556 at a second end. The mount plate 556 is disc-shaped and includes a central hole 558 and a plurality of fastener receiving projections 561. The mount plate 556 connects the single-ball connector 550 to the rearview housing 12d.

Figure 21:
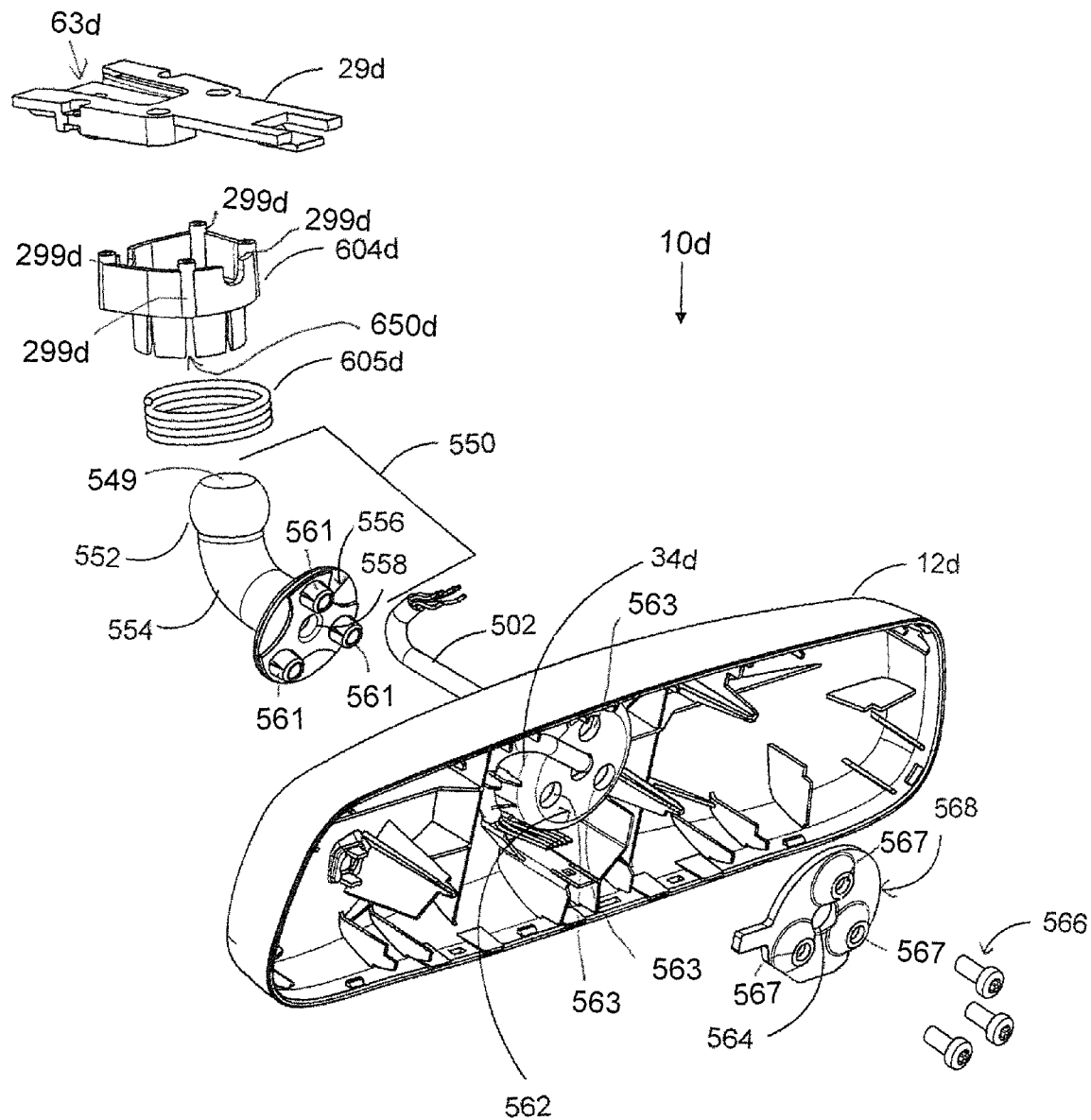
FIG. 21 is an exploded perspective view of a fifth embodiment of the rearview assembly of the present invention.

In the illustrated embodiment, the rearview housing 12d includes a substantially planar mounting area 562 for connecting the rearview housing 12d to the single-ball connector 550. A rear side of the substantially planar mounting area 562 abuts the mount plate 556 of the single-ball connector 550. The rear side of the substantially planar mounting area 262 also includes holes 563 for accepting the fastener receiving projections 561 of the mount plate 556 therein for preventing rotation of the single-ball connector 550 relative to the rearview housing 12d and for connecting the single-ball connector 550 to the rearview housing 12d. As illustrated in FIG. 21, a mounting washer 568 is abutted against a front side of the substantially planar mounting area 562 and fasteners 566 is inserted through apertures 567 in the mounting washer 568, the substantially planar mounting area 562 of the rearview housing 12d and into the fastener receiving projections 561 of the mount plate 556 of the single-ball connector 550 to connect the single-ball connector 550 to the rearview housing 12d.

The illustrated rearview assembly 10d is configured to have wiring 502 routed from the vehicle to the rearview housing 12d through the mount 29d, the connector 604d, into the single-ball connector 550 through an opening 549 in the connection ball 552 of the single-ball connector 550, through a hollow interior of the bent connector portion 554 (which could include a divider), through a center hole 558 in the mount plate 556 of the single-ball connector 550, through a center opening in the substantially planar mounting area 562 of the rearview housing 12d and through a center opening 564 in the mounting washer 568.

It is contemplated that the present inventive concepts can be used in combination with mirrors (interior and/or exterior) having many different options to create synergistic and non-obvious combinations that provide surprising and unexpected benefits not previously possible. Therefore, it will be appreciated by those skilled in the art that various other vehicle accessories and components may be incorporated in the previously described rearview assembly 10 for a vehicle in whole or in part and in various combinations. Such vehicle accessories and components may be mounted within, on or to the housing 12a-12d, the mount 29a-29d, attachment to the rearview housing 12a-12d or the mount 29a-29d, or in a console or other housing associated with the interior rearview mirror having the rearview assembly 10-10d of the present invention. Additionally, any such vehicle accessories may share components with one another, such as processors, sensors, power supplies, wire harnesses and plugs, displays, switches, antennae, etc. Examples of other vehicle accessories, components or features are described further below. It is noted that the description below uses the reference numbers of the first embodiment of the rearview assembly 10, the examples can be used with any of the embodiments of the rearview assembly 10-10d described above.

Figure 19A:
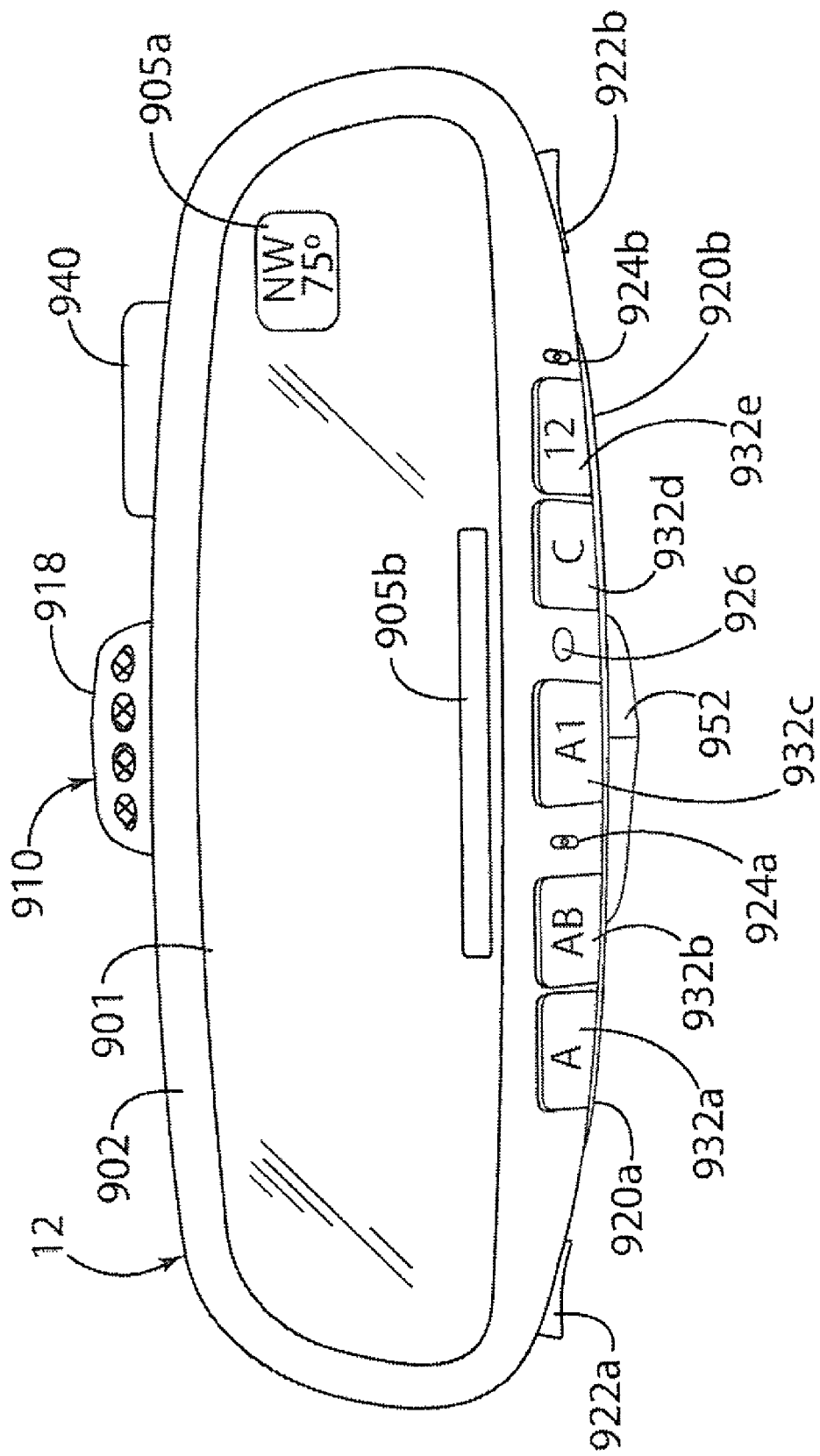
FIG. 19A is an elevational view of the front of the rearview assembly constructed according to the present invention.
Figure 19B:
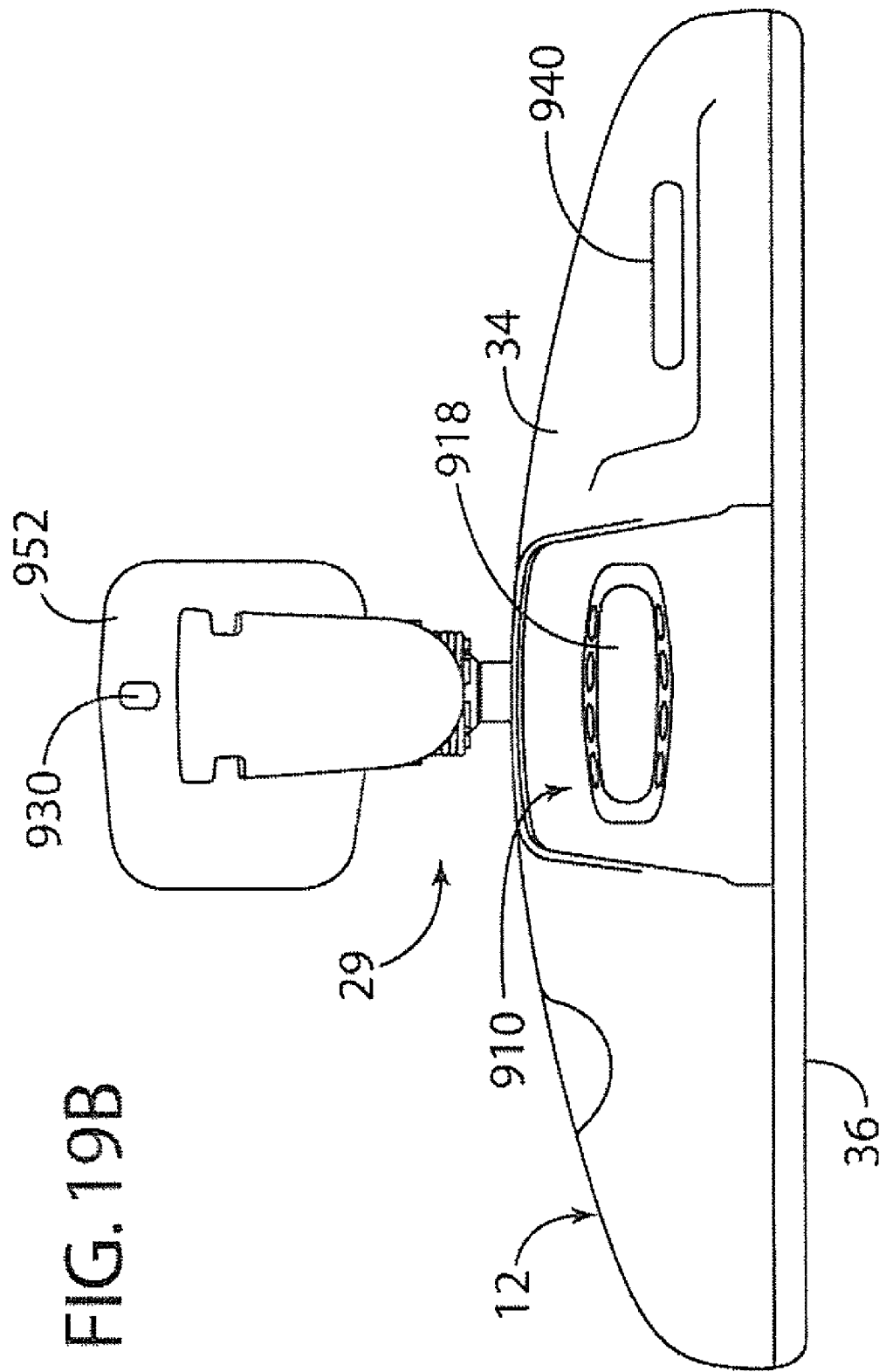
FIG. 19B is a plan view of the top of the rearview assembly constructed according to the present invention.

An example of a system incorporated in the interior rearview mirror includes an electronic compass system within the housing 12 of the interior rearview mirror as described in U.S. Pat. No. 7,149,627 entitled ELECTRONIC COMPASS SYSTEM, the entire contents of which are incorporated in its entirety herein by reference. FIGS. 19A-19B show another embodiment of the interior rearview mirror in which any of the electronic compass systems described in U.S. Pat. No. 7,149,627 are incorporated. As illustrated in FIGS. 19A-19B, the housing 12 comprises the bezel 36 and the rear housing section 34. The bezel 36 and the rear housing section 34 combine to define the housing 12 for incorporation of features in addition to a rearview element 16 and information displays 905a and 905b. Commonly assigned U.S. Pat. Nos. 6,102, 546, D410,607, 6,407,468, 6,420,800, and 6,471,362, the disclosures of which are incorporated in their entireties herein by reference, describe examples of various bezels, cases and associated button constructions that may be used with the present invention.

Figure 18B:
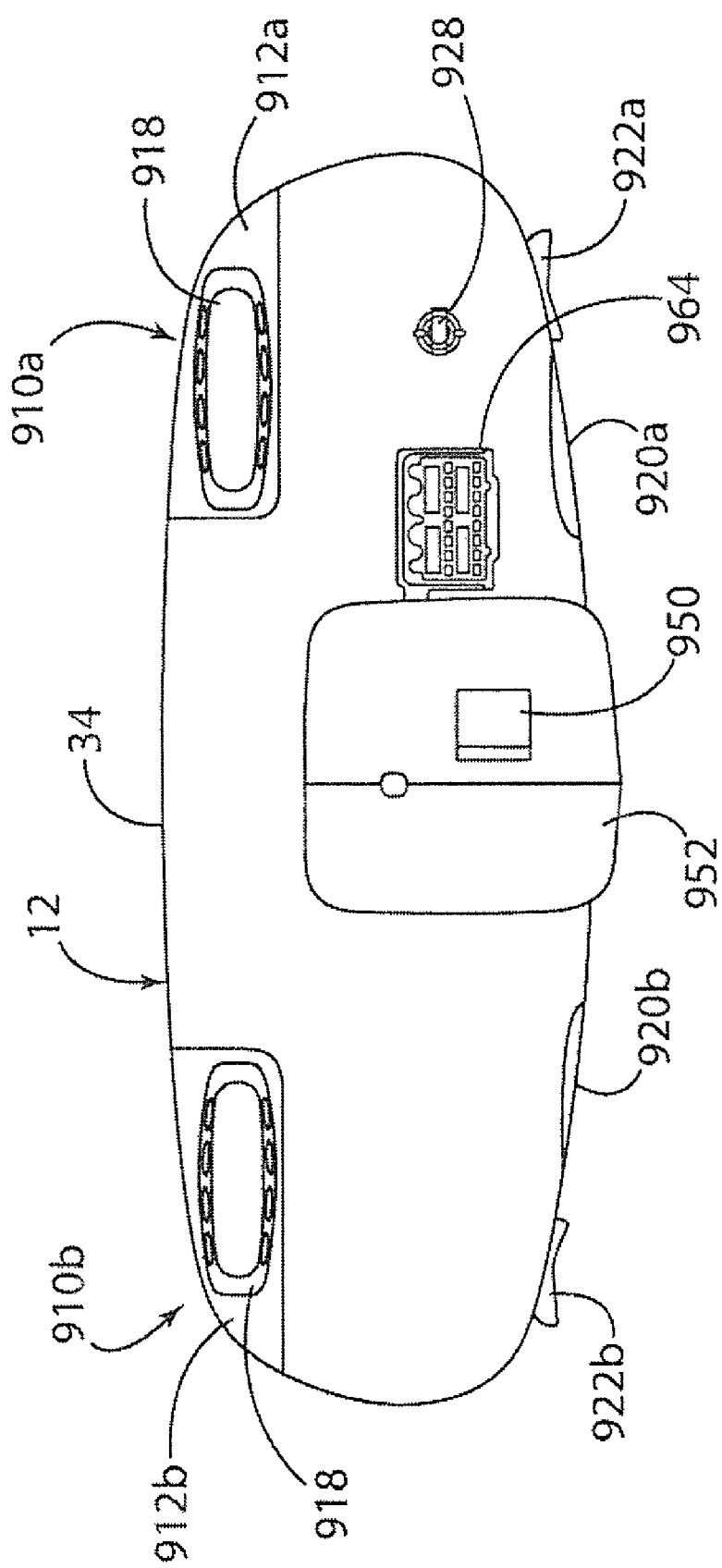
FIG. 18B is an elevational view of the rear of the rearview assembly constructed according to the present invention.
Figure 18C:
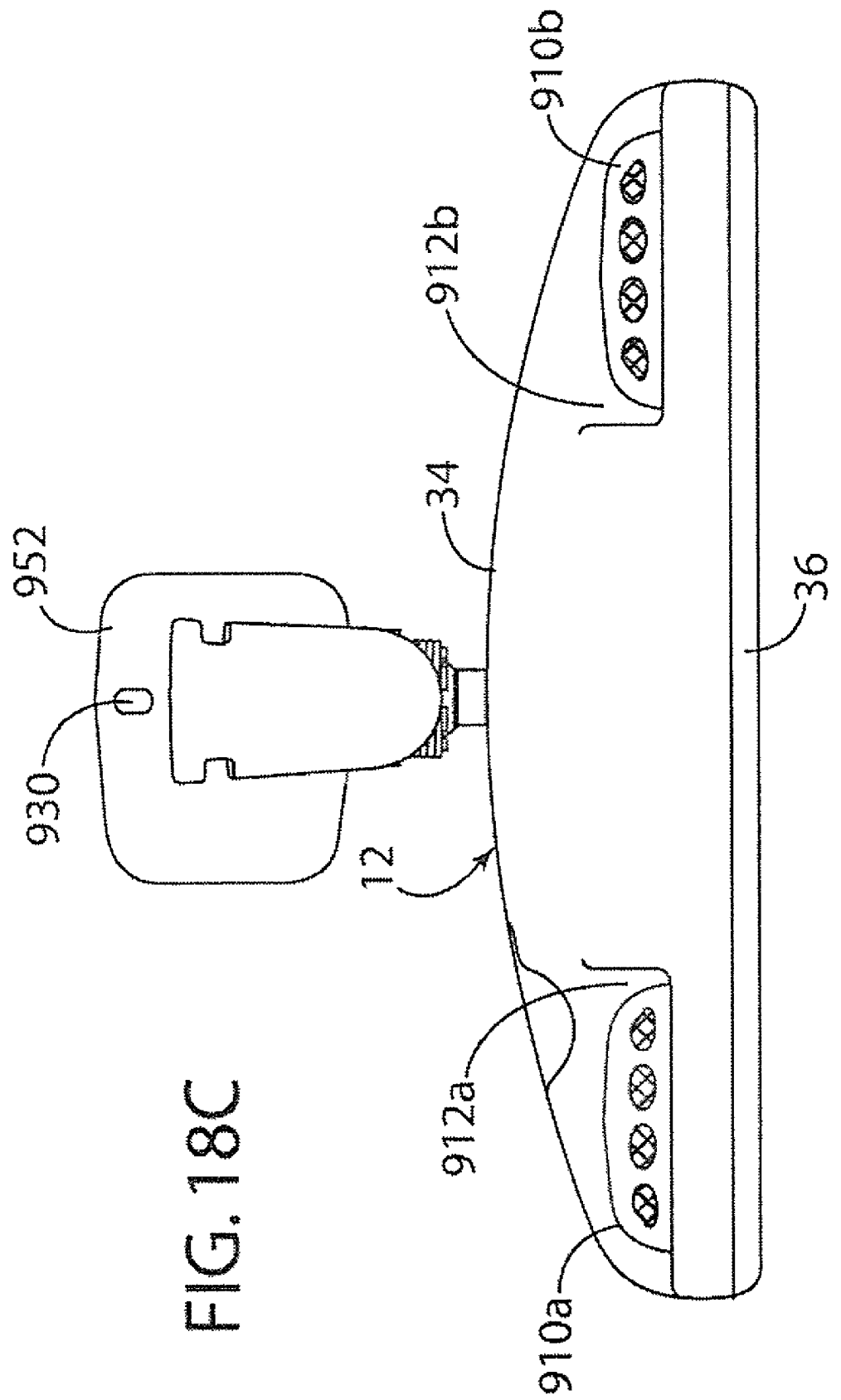
FIG. 18C is a plan view of the top of the rearview assembly constructed according to the present invention.

As depicted in FIGS. 18A-18C, the interior rearview mirror may comprise first and second microphones 910a and 910b. Examples of microphones for use with the present invention are described in commonly assigned U.S. Pat. Nos. 7,120,261 and 6,614,911, U.S. Patent Application Publication No. US 2002/0110256 A1, and PCT Application Publication No. WO/2003/041285 A1, the disclosures of which are incorporated in their entireties herein by reference. Although the two microphones are shown as being mounted to the backside of rear housing section 34, one or more such microphones may be mounted on the top of the interior rearview mirror (as shown in FIGS. 19A and 19B), on the bottom of the interior rearview mirror, or anywhere within the rear housing section 34 or bezel 36. Preferably, two microphones 910a and 910b are incorporated, one near each end, into the interior rearview mirror on the backside of the rear housing section 34 within recessed portions 912a and 912b. As shown in FIG. 18A, the microphones are constructed with acoustic dam 914 extending around transducer 916 within microphone housing 918. Additional details of this preferred construction are disclosed in commonly assigned International PCT Application Publication No. WO/2003/041285 A1. The audio systems including the microphones may be integrated, at least in part, in a common control with information displays and/or may share components with the information displays. In addition, the status of these systems and/or the devices controlled thereby may be displayed on the associated information displays.

As shown in FIGS. 19A and 19B, a single microphone 910 is provided on the top side of the housing 12. In this construction, it is preferable to include two transducers in microphone housing 918 in a manner similar to that disclosed in the above-referenced International PCT Application Publication No. WO/2003/041285 A1 and U.S. Patent Application Publication No. US 2002/0110256 A1.

The interior rearview mirror may also include first and second switches 922a and 922b. Suitable switches for use with the present invention are described in detail in commonly assigned U.S. Pat. Nos. 6,407,468, 6,420,800, 6,426,568, and 6,471,362, as well as commonly assigned U.S. Patent Application Publication No. US 2002/0024713 A1, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using the switches.

The interior rearview mirror may also include first and second indicators 924a and 924b. Various indicators for use with the present invention are described in commonly assigned U.S. Pat. Nos. 5,803,579, 6,335,548, 6,441,943, 6,521,916, 6,523,976, 6,670,207, and 6,805,474 as well as commonly assigned U.S. Patent Application Publication No. US 2004/0239243 A1, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

The interior rearview mirror may further include first and second light sensors 928 serving as glare and ambient sensors, respectively. Preferred light sensors for use within the present invention are described in detail in commonly assigned U.S. Pat. Nos. 5,923,027, 6,313,457, 6,359,274, 6,379,013, 6,402,328, and 6,831,268, and U.S. Patent Application Publication No. US 2002/0056806 A1, the disclosures of which are incorporated in their entireties herein by reference. The glare sensor and/or ambient sensor automatically control the reflectivity of a self dimming reflective element as well as the intensity of information displays and/or backlighting. The glare sensor may also be used to sense headlights of trailing vehicles and the ambient sensor is used to detect the ambient lighting conditions that the system is operating within. In another embodiment, a sky sensor 930 may be incorporated positioned to detect light levels generally above and in front of the associated vehicle. The sky sensor 930 may be used to automatically control the reflectivity of a self-dimming element, the exterior lights of a controlled vehicle and/or the intensity of information displays. The interior rearview mirror may further include sun-load sensors for sensing light levels towards the driver side and passenger side of the vehicle so as to control the climate control system of the vehicle.

Additionally, the interior rearview mirror may include first, second, third, fourth and fifth operator interfaces 932a-932e located in the bezel 36. Each operator interface is shown to comprise a backlit information display "A," "AB," "A1," "49," and "12". It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420, 800, 6,426,568, and 6,471,362, as well as commonly assigned U.S. Patent Application Publication No. US 2002/0024713 A1, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold. The display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 18A-18C, 19A and 19B, it should be understood that fewer or more individual devices may be incorporated in any location within the associated vehicle and as described within the references incorporated herein.

A mount 29 is included for mounting the interior rearview mirror within a vehicle either to the windshield, or to the vehicle roof structure. It should be understood that a host of accessories may be incorporated into the mount 29 or into a housing 952 attached to the mount 29 such as a rain sensor (and therefore outside of a periphery of the button), a camera, a headlight control, additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays. An example of a rain sensor in a mount 29 is disclosed in commonly assigned U.S. Patent Application Publication No. US 2004-0232773 A1, the entire disclosure of which is incorporated in its entirety herein by reference.

The interior rearview mirror is shown in FIG. 18A to further comprise the circuit board 38 on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of the reflective element 16 and/or the intensity of any one or all of the displays 905a and 905b. The details of various control circuits for use herewith are described in commonly assigned U.S. Pat. Nos. 5,883,605, 5,956,012, 6,084,700, 6,222,177, 6,244,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module is described as being mounted to circuit board 38, it should be understood that the sensor module may be located within the mount 29, with an accessory module of the interior rearview mirror or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

The circuit board 38 may comprise a controller (not shown), such as a microprocessor, and the daughter board 962 may comprise an information display 905a. The microprocessor may, for example, receive signal(s) from the compass sensor module and process the signal(s) and transmit signal(s) to the daughter board to the control display 905a to indicate the corresponding vehicle heading. As described herein and within the references incorporated by reference herein, the controller may receive signal(s) from light sensor(s), rain sensor(s), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the compass system may, at least in part, control the reflectivity of the rearview element 16, exterior lights, the rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller (or controllers) may receive signals from switches and/or sensors associated with any of the devices described herein and in the references incorporated by reference herein to automatically manipulate any other device described herein or described in the references included by reference. The controller may be, at least in part, located outside the interior rearview mirror or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, 6,379,013, 6,587,573, 6,611,610, 6,621,616, 6,774,988, and 6,861,809, U.S. Patent Application Publication No. US 2002/0005472 A1 and U.S. Patent Application Publication Nos. U.S. 2004-0143380 A1 and U.S. 2004-0008410 A1, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in accessory housing 952 attached to the mount bracket 29.

Moisture sensors and windshield fog detector systems are described in commonly-assigned U.S. Pat. Nos. 5,923,027, 6,313,457, 6,617,564 and 6,681,163, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The interior rearview mirror may further include one or more antennae 940 for receipt and/or transmission of RF signals. Appropriate receiving, transmitting, and/or processing circuitry may further be included in or attached to the interior rearview mirror. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in an interior rearview mirror system are disclosed in commonly assigned U.S. Pat. Nos. 6,215,389, 6,431,712, 6,696,935, and 6,861,942, the entire disclosures of which are incorporated herein by reference. Examples of a GPS system incorporated in the interior rearview mirror are disclosed in commonly assigned U.S. Pat. Nos. 6,166,698, 6,297,781, 6,396,446, and in U.S. Patent Application Publication No. US 2002/0032510 A1, the entire disclosures of which are incorporated herein by reference. An example of a LORAN system incorporated in an interior rearview mirror system is disclosed in commonly assigned U.S. Patent Application Publication No. US 2002/0193946 A1, the entire disclosure of which is incorporated herein by reference. An example of both a telephone/telematics system and a BLUETOOTH™ system incorporated in an interior rearview mirror system is disclosed in commonly assigned U.S. Patent Application Publication No. US 2002/0032510 A1, the entire disclosure of which is incorporated herein by reference. Examples of trainable garage door opening systems and RKE systems incorporated in an interior rearview mirror system are disclosed in U.S. Pat. No. 6,091,183, the entire disclosures of which are incorporated herein by reference.

The interior rearview mirror may further include an infrared (IR) transmitter/receiver for transmitting/receiving information to and from the interior rearview mirror and possibly to and from the vehicle. An example of such an interior rearview mirror system is disclosed in commonly-assigned U.S. Pat. No. 6,407,712, the entire disclosure of which is incorporated herein by reference.

The interior rearview mirror may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,186,698 may be used, the entire disclosure of which is incorporated herein by reference. Examples of backlit indicia panel displays are disclosed in commonly-assigned U.S. Pat. Nos. 6,170,956, 6,356,376, 6,572,233 and 6,870,655, the entire disclosures of which are incorporated herein by reference. Various displays used in interior rearview mirror systems are disclosed in commonly assigned U.S. Pat. No. 6,356,376 and in U.S. Patent Application Publication No. US 2002/0154379 A1, the entire disclosures of which are incorporated herein by reference.

The wiring for the vehicle accessories in the interior rearview mirror may be run through the mount 29 and along the windshield (if the mount 29 does not already extend to the headliner) under a wire cover 37. An example of an interior rearview mirror system in which the wiring for accessories in the housing 12 are routed through the mount 29 is disclosed in commonly assigned U.S. Pat. No. 6,467,919, the entire disclosure of which is incorporated herein by reference.

While the present invention has been described as being implemented with the sensors positioned within the housing 12 of the interior rearview mirror, the sensors could be mounted in the mounting foot or in any other location of the interior rearview mirror. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

It is further contemplated that the rearview mirror assembly 10 of the present invention could be used with the quick-attach mirror mounting structure facilitating assembly as disclosed in U.S. Patent Application No. US 2004/0195486 A1, the entire contents of which are hereby incorporated herein by reference. The quick-attach mirror mounting structure facilitating assembly as disclosed in U.S. Patent Application No. US 2004/0195486 A1 further allows the rearview mirror assembly 10 to be assembled by moving all of the parts of the rearview mirror assembly 10 together to connect the reflective element 16 to the mount (both mechanically and electrically) along with all of the elements between the reflective element and the mount.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. For example, it is contemplated that all parts (button, mount, receivers, connector and housing) could be made out of any material (e.g., ferrous and non-ferrous metals, polymeric materials with or without natural fibers and/or resins, and/or natural materials) and could be made in any manner (e.g., stamping, injection molding, deep drawing, etc.). Additionally, it is contemplated that the two-ball connector 300 or the single ball mount connector assembly 1000 could be made of cast metal (e.g., zinc, aluminum or magnesium) or injection molded materials of metal and polymers (e.g., partially aromatic polyamides (e.g., nylons), which can promote dimensional stability and block water absorption which can cause variation in hydroscopic nylon resins). Furthermore, fillers (e.g., short and long fiber glass rods, mica, ceramic and mineral types) may be blended into a resin or polymer matrix used to make the two-ball connector 300 or the single ball mount connector assembly 1000 to enhance strength and damping. These materials can then be painted or powder coated to provide a desired surface finish. Moreover, it is contemplated that the receivers 604, 606 could have the structure and composition of the receivers disclosed in U.S. patent application Ser. No. 12/187,019 entitled TWO BALL MOUNT WITH WIRING PASSAGE, the entire contents of which are hereby incorporated by reference, or other structures or compositions. Additionally, it is contemplated that the center tubular section 608 can be bent (as illustrated) or straight. Furthermore, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

We claim:

1. An interior rearview assembly comprising:
a mount configured to be connected to a vehicle;
a rearview housing having a rearview element therein; and
a two-ball connector comprising a center hollow tubular section, a first pivot ball at a first end of the center hollow tubular section and a second pivot ball at a second end of the center hollow tubular section, the two-ball connector being configured to be located between the mount and the rearview housing for allowing the rearview housing to be pivoted relative to the mount along two points of rotation, with a first point of rotation being located within the first pivot ball and a second point of rotation being located within the second pivot ball;
the two-ball connector having a wiring passage therethrough, with the wiring passage having a divider to separate at least a portion of the wiring passage into a closed first wiring passage area and a second closed wiring passage area, and with the first closed wiring passage area and the second closed wiring passage area being separated by the divider;

wherein the first closed wiring passage is configured to completely surround wiring and the second closed wiring passage is configured to completely surround wiring.

2. The interior rearview assembly of claim 1, wherein: the two-ball connector is formed of at least two separate parts comprising a first part and a second part.

3. The interior rearview assembly of claim 2, wherein: the divider is integral with the first part.

4. The interior rearview assembly of claim 1, wherein: at least one of the first point of rotation and the second point of rotation comprises a single axis of rotation.

5. The interior rearview assembly of claim 1, wherein: the rearview element is a reflective element.

6. The interior rearview assembly of claim 5, wherein: the reflective element comprises an electrochromic mirror subassembly including a front glass element and a rear glass element, with electrochromic material located between the front glass element and the rear glass element.

7. The interior rearview assembly of claim 1, further including:
a first receiver having a plurality of first fingers defining a first ball receiving area;
a second receiver having a plurality of second fingers defining a second ball receiving area;
a first spring forming a circle around the first fingers of the first receiver;
a second spring forming a circle around the second fingers of the second receiver;
wherein the first receiver is connected to the mount and is configured to receive the first ball within the first ball receiving area; and
wherein the second receiver is connected to the rearview housing and is configured to receive the second ball within the second ball receiving area.

8. The interior rearview assembly of claim 7, wherein: the first receiver is removably connected to the mount; and the second receiver is removably connected to the rearview housing.

9. The interior rearview assembly of claim 1, wherein: the divider includes an electro-magnetic interference prevention component for preventing electro-magnetic interference between wiring in the first closed first wiring passage area and wiring in the second closed wiring passage area.

10. An interior rearview assembly comprising:
a mount configured to be connected to a vehicle;
a rearview housing having a rearview element therein; and
a connector comprising a center hollow tubular section, a first end and a second end, the connector being configured to be located between the mount and the rearview housing for allowing the rearview housing to be pivoted relative to the mount along two points of rotation, with a first point of rotation being located within the first end and a second point of rotation being located within the second end;
the connector having wiring passage therethrough with the wiring passage having a divider integral with the connector to separate at least a portion of the wiring passage into a first closed wiring passage area and a second closed wiring passage area with the first wiring passage area and the second wiring passage area being separated by the divider;
the connector being formed of at least two separate parts comprising a first part and a second part;
wherein when the at least two separate parts are spaced, the wiring passage is open for allowing the laying of wiring therein and when the at least two separate parts are engaged, the wiring passage is closed to maintain the wiring with the wiring passage of the center hollow tubular section.

11. The interior rearview assembly of claim 10, wherein: the first end comprises a first pivot ball and the second end comprises a second pivot ball.

12. The interior rearview assembly of claim 11, further including:
a first receiver having a plurality of first fingers defining a first ball receiving area;
a second receiver having a plurality of second fingers defining a second ball receiving area;
a first spring forming a circle around the first fingers of the first receiver;
a second spring forming a circle around the second fingers of the second receiver;
wherein the first receiver is connected to the mount and is configured to receive the first ball within the first ball receiving area; and
wherein the second receiver is connected to the rearview housing and is configured to receive the first ball within the first ball receiving area.

13. The interior rearview assembly of claim 12, wherein: the first receiver is removably connected to the mount; and the second receiver is removably connected to the rearview housing.

14. The interior rearview assembly of claim 10, wherein: the divider is integral with the first part.

15. The interior rearview assembly of claim 10, wherein: at least one of the first point of rotation and the second point of rotation comprises a single line of rotation.

16. The interior rearview assembly of claim 10, wherein: the rearview element is a reflective element.

17. The interior rearview assembly of claim 16, wherein: the reflective element comprises an electrochromic mirror subassembly including a front glass element and a rear glass element, with electrochromic material located between the front glass element and the rear glass element.

18. The interior rearview assembly of claim 10, wherein: the divider includes an electro-magnetic interference prevention component for preventing electro-magnetic interference between wiring in the first closed first wiring passage area and wiring in the second closed wiring passage area.

19. A method of assembling an interior rearview assembly comprising:
providing a mount configured to be connected to a vehicle;
providing a rearview housing having a rearview element therein; and
providing a two-ball connector comprising a center hollow tubular section, a first pivot ball at a first end of the center hollow tubular section and a second pivot ball at a second end of the center hollow tubular section;
locating the two-ball connector being between the mount and the rearview housing for allowing the rearview housing to be pivoted relative to the mount along two points of rotation, with a first point of rotation being located within the first pivot ball and a second point of rotation being located within the second pivot ball;
providing the two-ball connector with a wiring passage therethrough, with the wiring passage having a divider;

separating at least a portion of the wiring passage into a closed first wiring passage area and a second closed wiring passage area with a divider;

placing first wiring into the first closed wiring passage area, with the first closed wiring passage surrounding the first wiring; and placing second wiring into the second closed wiring passage area, with the second closed wiring passage surrounding the second wiring.

20. The method of assembling an interior rearview assembly of claim 19, further including:

forming the two-ball connector from at least two separate parts comprising a first part and a second part.

21. The method of assembling an interior rearview assembly of claim 19, wherein:

the rearview element is a reflective element.

22. The method of assembling an interior rearview assembly of claim 19, further including:

providing a first receiver having a plurality of first fingers defining a first ball receiving area;

providing a second receiver having a plurality of second fingers defining a second ball receiving area;

positioning a first spring around the first fingers of the first receiver;

positioning a second spring around the second fingers of the second receiver;

connecting the first receiver to the mount;

receiving the first ball within the first ball receiving area;

connecting the second receiver to the rearview housing; and receiving the second ball within the second ball receiving area.

23. A method of assembling an interior rearview assembly comprising:

providing a mount configured to be connected to a vehicle;

providing a rearview housing having a rearview element therein; and providing a connector comprising a center hollow tubular section, a first end and a second end;

locating the connector being between the mount and the rearview housing for allowing the rearview housing to be pivoted relative to the mount along two points of rotation, with a first point of rotation being located within the first end and a second point of rotation being located within the second end;

providing the connector with wiring passage therethrough, with the wiring passage having a divider integral with the connector;

separating at least a portion of the wiring passage into a first wiring passage area and a second wiring passage area with a divider;

forming the connector from at least two separate parts comprising a first part and a second part;

placing first wiring into the first wiring passage area by placing the first wiring onto the first part and engaging the first part with the second part; and placing second wiring into the second wiring passage area by placing the second wiring onto the first part and engaging the first part with the second part;

wherein when the at least two separate parts are engaged, the wiring passage is closed to maintain the wiring with the wiring passage of the connector.

24. The method of assembling an interior rearview assembly of claim 23, wherein:

the first end comprises a first pivot ball and the second end comprises a second pivot ball.

25. The method of assembling an interior rearview assembly of claim 24, further including:

providing a first receiver having a plurality of first fingers defining a first ball receiving area;

providing a second receiver having a plurality of second fingers defining a second ball receiving area;

positioning a first spring around the first fingers of the first receiver;

positioning a second spring around the second fingers of the second receiver;

connecting the first receiver to the mount;

receiving the first ball within the first ball receiving area;

connecting the second receiver to the rearview housing; and receiving the second ball within the second ball receiving area.

26. An interior rearview assembly comprising:

a rearview housing having a rearview element therein; and a connector assembly configured to be connected to a vehicle, the connector assembly comprising a hollow tubular section and a first end, the connector being configured to be connected to the rearview housing for allowing the rearview housing to be pivoted relative to the connector assembly along a point of rotation, with a first point of rotation being located within the first end;

the connector assembly having a wiring passage therethrough;

the connector assembly being formed of at least two separate parts comprising a first part and a second part, the two part forming the wiring passage;

wherein when the at least two separate parts are spaced in a spaced position, the wiring passage is open for allowing the laying of wiring therein, and when the at least two separate parts are engaged in an engaged position, the wiring passage is closed to maintain the wiring within the wiring passage of the hollow tubular section;

wherein the wiring passage has an entrance and an exit whereby the wiring is configured to extend through the entrance and the exit when the at least two separate parts are in the engaged position, the wiring passage forming a passage line between an entrance center of the entrance and an exit center of the exit; and wherein the at least two separate parts include mutual complementary engagement features configured to be engaged to thereby close the wiring passage when the at least two separate parts are moved from the spaced position to the engaged position along a movement line perpendicular to the passage line.

27. The interior rearview assembly of claim 26, further including:

a mount configured to be connected to a vehicle;

wherein the connector assembly comprises a two-ball connector comprising the hollow tubular section, a first pivot ball at the first end and a second pivot ball at a second end of the connector assembly, the two-ball connector being configured to be located between the mount and the rearview housing for allowing the rearview housing to be pivoted relative to the mount along two points of rotation, with the first point of rotation being located within the first pivot ball and a second point of rotation being located within the second pivot ball.

28. The interior rearview assembly of claim 27, wherein:

the wiring passage has a divider to separate at least a portion of the wiring passage into a closed first wiring passage area and a second closed wiring passage area, and with the first closed wiring passage area and the second closed wiring passage area being separated by the divider.

29. The interior rearview assembly of claim 27, wherein: at least one of the first point of rotation and the second point of rotation comprises a single axis of rotation.

30. The interior rearview assembly of claim 27, further including:
a first receiver having a plurality of first fingers defining a first ball receiving area;
a second receiver having a plurality of second fingers defining a second ball receiving area;
a first spring forming a circle around the first fingers of the first receiver;
a second spring forming a circle around the second fingers of the second receiver;
wherein the first receiver is connected to the mount and is configured to receive the first ball within the first ball receiving area; and
wherein the second receiver is connected to the rearview housing and is configured to receive the second ball within the second ball receiving area.

31. The interior rearview assembly of claim 26, wherein: the rearview element is a reflective element.

32. The interior rearview assembly of claim 26, further including:
a mount configured to be connected to a vehicle;
wherein the connector assembly comprises the hollow tubular section, the first end and a second end, the connector assembly being configured to be located between the mount and the rearview housing for allowing the rearview housing to be pivoted relative to the mount along two points of rotation, with the first point of rotation being located within the first end and a second point of rotation being located within the second end;
wherein the wiring passage has a divider integral with the connector assembly to separate at least a portion of the wiring passage into a first closed wiring passage area and a second closed wiring passage area with the first wiring passage area and the second wiring passage area being separated by the divider.

33. The interior rearview assembly of claim 32, wherein: the first end comprises a first pivot ball and the second end comprises a second pivot ball.

34. The interior rearview assembly of claim 33, further including:
a first receiver having a plurality of first fingers defining a first ball receiving area;
a second receiver having a plurality of second fingers defining a second ball receiving area;
a first spring forming a circle around the first fingers of the first receiver;
a second spring forming a circle around the second fingers of the second receiver;
wherein the first receiver is connected to the mount and is configured to receive the first ball within the first ball receiving area; and
wherein the second receiver is connected to the rearview housing and is configured to receive the first ball within the first ball receiving area.

35. The interior rearview assembly of claim 26, wherein: the connector assembly includes a mounting portion configured to be connected to a vehicle and a wiring portion, the wiring portion comprising the at least two separate parts and forming a ball for connection with the rearview housing, the ball having the first point of rotation therein.

36. The interior rearview assembly of claim 35, wherein: the first point of rotation comprises a single axis of rotation.

37. The interior rearview assembly of claim 35, further including:
a receiver having a plurality of fingers defining a ball receiving area; and
a spring forming a circle around the fingers of the receiver;
wherein the receiver is connected to the rearview housing and is configured to receive the ball within the ball receiving area.

38. The interior rearview assembly of claim 37, wherein: the receiver is removably connected to the rearview housing.

39. A method of assembling an interior rearview assembly comprising:
providing a rearview housing having a rearview element therein;
providing a connector assembly configured to be connected to a vehicle, the connector assembly comprising a hollow tubular section and a first end;
connecting the connector assembly to the rearview housing for allowing the rearview housing to be pivoted relative to the connector assembly along a point of rotation, with the point of rotation being located within the first end;
providing the connector with a wiring passage therethrough, the wiring passage having an entrance and an exit, the wiring passage forming a passage line between an entrance center of the entrance and an exit center of the exit;
forming the connector assembly from at least two separate parts comprising a first part and a second part;
placing wiring into the wiring passage area by placing wiring onto the first part;
providing the at least two separate parts with mutual complementary engagement features;
closing the wiring passage by engaging the at least two separate parts along a movement line perpendicular to the passage line whereby the wiring extends through the entrance and exit of the wiring passage; and
engaging the mutual complementary engagement to close the wiring passage as the at least two separate parts are moved along the movement line;
wherein when the at least two separate parts are engaged, the wiring passage is closed to maintain the wiring within the wiring passage of the connector.

40. The method of assembling an interior rearview assembly of claim 39, further including:
providing a mount configured to be connected to a vehicle;
providing the connected assembly with a two-ball connector comprising the hollow tubular section, a first pivot ball at the first end of the hollow tubular section and a second pivot ball at a second end of the hollow tubular section; and
locating the two-ball connector being between the mount and the rearview housing for allowing the rearview housing to be pivoted relative to the mount along two points of rotation, with a first point of rotation being located within the first pivot ball and a second point of rotation being located within the second pivot ball.

41. The method of assembling an interior rearview assembly of claim 40, further including:
separating at least a portion of the wiring passage into a closed first wiring passage area and a second closed wiring passage area with a divider;
placing first wiring into the first closed wiring passage area, with the first closed wiring passage surrounding the first wiring; and placing second wiring into the second closed wiring passage area, with the second closed wiring passage surrounding the second wiring.

42. The method of assembling an interior rearview assembly of claim 41, wherein:
the divider is integral with the first part.

43. The method of assembling an interior rearview assembly of claim 41, wherein:
at least one of the first point of rotation and the second point of rotation comprises a single line of rotation.

44. The method of assembling an interior rearview assembly of claim 41, further including:
providing a first receiver having a plurality of first fingers defining a first ball receiving area;
providing a second receiver having a plurality of second fingers defining a second ball receiving area;
positioning a first spring around the first fingers of the first receiver;
positioning a second spring around the second fingers of the second receiver;
connecting the first receiver to the mount;
receiving the first ball within the first ball receiving area;
connecting the second receiver to the rearview housing; and
receiving the second ball within the second ball receiving area.

45. The method of assembling an interior rearview assembly of claim 40, wherein:
the divider includes an electro-magnetic interference prevention component for preventing electro-magnetic interference between the first wiring and the second wiring.

46. The method of assembling an interior rearview assembly of claim 39, wherein:
the rearview element is a reflective element.

47. The method of assembling an interior rearview assembly of claim 46, wherein:
the reflective element comprises an electrochromic mirror subassembly including a front glass element and a rear glass element, with electrochromic material located between the front glass element and the rear glass element.

48. The method of assembling an interior rearview assembly of claim 39, wherein:
the connector assembly includes a mounting portion configured to be connected to a vehicle and a wiring portion, the wiring portion comprising the at least two separate parts and forming a ball for connection with the rearview housing, the ball having the first point of rotation therein.

49. The method of assembling an interior rearview assembly of claim 48, wherein:
the first point of rotation comprises a single axis of rotation.

50. The method of assembling an interior rearview assembly of claim 48, further including:
providing a receiver having a plurality of fingers defining a ball receiving area;
providing a spring forming a circle around the fingers of the receiver;
connecting the receiver to the rearview housing; and
receiving the ball within the ball receiving area of the receiver.

51. The method of assembling an interior rearview assembly of claim 50, further including:
removably connecting the receiver to the rearview housing.

* * * * *